(12) United States Patent
Viken

(10) Patent No.: US 6,446,682 B1
(45) Date of Patent: Sep. 10, 2002

(54) AUTO-LOADING FLUID EXCHANGER AND METHOD OF USE

(76) Inventor: James P. Viken, 9890 Crestwood Ter., Eden Prairie, MN (US) 55347

( * ) Notice: Subject to any disclaimer, the term of this patent is extended or adjusted under 35 U.S.C. 154(b) by 0 days.

(21) Appl. No.: 09/846,982

(22) Filed: May 1, 2001

Related U.S. Application Data

(63) Continuation of application No. 09/757,960, filed on Jan. 10, 2001, and a continuation of application No. 09/301,851, filed on Apr. 29, 1999, now Pat. No. 6,223,790, and a continuation of application No. 08/772,836, filed on Dec. 24, 1996, which is a continuation of application No. 08/469,673, filed on Jun. 6, 1995, now abandoned.
(60) Provisional application No. 60/100,895, filed on Oct. 23, 1998, provisional application No. 60/098,853, filed on Sep. 2, 1998, provisional application No. 60/083,557, filed on Apr. 29, 1998, provisional application No. 60/072,403, filed on Jan. 23, 1998, provisional application No. 60/071,884, filed on Jan. 23, 1998, and provisional application No. 60/072,289, filed on Jan. 23, 1998.

(51) Int. Cl.$^7$ .................................................. B65B 1/04
(52) U.S. Cl. ............................ 141/59; 141/65; 141/98; 184/1.5
(58) Field of Search ........................... 141/98, 192, 65, 141/59; 184/1.5; 417/521

(56) References Cited

U.S. PATENT DOCUMENTS

| 5,505,593 A | * | 4/1996 | Hartley et al. |
| 5,522,474 A | * | 6/1996 | Burman |
| 5,616,005 A | * | 4/1997 | Whitehead |

* cited by examiner

Primary Examiner—Steven O. Douglas
(74) Attorney, Agent, or Firm—Fulbright & Jaworski L.L.P.

(57) ABSTRACT

This invention provides a fluid system for exchanging used hydraulic fluid with fresh hydraulic fluid in an accessed hydraulic circuit. One particular application provides an exchange apparatus for exchanging fluids of the type found in motor vehicle hydraulic circuits. The exchange apparatus may utilize pressurized spent fluid flow as a fluid power medium to activate the auto-replenishing fluid exchanger system to replace the spent fluid with fresh fluid at equalized flow rates. Alternatively, the exchange apparatus may utilize pressurize fresh fluid as a fluid power medium to activate the exchange system. Additional power may be supplied by an external boost pump to supplement the flow of fluid.

29 Claims, 15 Drawing Sheets

AUTO-LOADING FLUID EXCHANGER AND METHOD OF USE

RELATED APPLICATIONS

This application is a continuation of U.S. patent application Ser. No. 09/301,851 filed Apr. 29, 1999, and now U.S. Pat. No. 6,223,790, issued on May 1, 2001, which application claimed the benefit of priority pursuant to 35 U.S.C. 119(e)(1) from the Provisional Patent application Serial No. 60/083,557 filed on Apr. 29, 1998, each application being incorporated herein by reference.

This application is a continuation of U.S. patent application Ser. No. 08/772,836, filed on Dec. 24, 1996, which was a continuation of U.S. patent application Ser. No. 08/469,673, filed on Jun. 6, 1995 (abandoned), each application being incorporated herein by reference.

This application is a continuation of U.S. patent application Ser. No. 09/757,960 filed Jan. 10, 2001, which was a continuation of U.S. patent application Ser. No. 08/469,673, filed on Jun. 6, 1995, each application being incorporated herein by reference.

Applicant has related U.S. Provisional applications: Ser. No. 60/072,403 filed Jan. 23, 1998, Ser. No. 60/071,884 filed Jan. 23, 1998; Ser. No. 60/098,853 filed Sep. 2, 1998, Ser. No. 60/100,895 filed Oct. 23, 1998; and Ser. No. 60/072,289 filed Jan. 23, 1998, each application being incorporated by reference herein in their entireties.

BACKGROUND OF THE INVENTION

1. Field of the Invention

This invention relates generally to fluid exchange systems and in particular to those useful in the exchanging of fluids of the types found in motor vehicles and pressurized hydraulic systems. Disclosed herein is a fluid exchange apparatus wherein used hydraulic fluid is exchanged for fresh fluid by interposing the invention in-line with a hydraulic fluid circulation circuit. The exchange apparatus may utilize pressurized spent fluid flow as a fluid power medium to activate the auto-replenishing fluid exchanger system to replace the spent fluid with fresh fluid at equalized flow rates. Alternatively, the exchange apparatus may be externally powered to replace the spent fluid with fresh fluid at equalized flow rates.

2. Related Background Art

A variety of hydraulic fluid exchange systems are known to those skilled in the art. One early example is the applicant's U.S. Pat. No. 5,318,080, which featured a pressure vessel divided into two chambers by a flexible diaphragm (See, FIG. 3). To refill this exchange system with fresh fluid in preparation for the exchange operation, fresh fluid was introduced into one chamber causing the diaphragm to distend and simultaneously force the spent fluid out of the second chamber. A particular characteristic of this device was the limited volumetric capacity of the pressure vessel, as the capacity of fluid exchange was substantially equal to the volume of the contained fresh fluid prior to the exchange process. If the volume of fresh fluid contained in fresh-fluid charged receiver was less than the desired exchange capacity, one would have to interrupt the exchange process upon discharge of the fresh fluid load, recharge the receiver with fresh fluid, and then reinstate the exchange process until the desired fluid capacity was exchanged. Merely increasing the volumetric capacity of the fluid receiver would concomitantly increase manufacturing costs, fluid friction losses, and the overall size of the exchange apparatus. As a result, the efficiency of such a device was limited by the volume of fresh fluid the device was able to contain.

An additional limitation of prior art exchange systems has been the requirement of on-board fluid tanks for holding fresh fluid and used fluid requirements. These tanks increase the overall size and weight of an exchange apparatus, making movement and storage of the fluid exchange apparatus burdensome.

SUMMARY OF THE INVENTION

The present invention solves many of the problems existent in prior hydraulic fluid exchange systems. The present invention provides a compact fluid exchange system having a fluid receiver which is substantially smaller than the amount of fluid exchanged during the exchange process. As the size of the fluid receiver in the present invention is not related to the volume of ultimately fluid exchanged, the apparatus can be used to service hydraulic fluid systems having a variety of circuit sizes, configurations, etc.

Briefly, the invention includes a reciprocating pump assembly having a pair of pumping chambers and a pair of working chambers. The pump assembly operates to receive used fluid from an accessed hydraulic fluid circuit into one of the working chambers, introduce fresh fluid from a pumping chamber into the hydraulic fluid circuit, simultaneously refill the other pumping chamber with fresh fluid, and simultaneously discharge spent fluid from the other working chamber into a spent fluid receptacle. Fluid flow relative to the pump assembly is directed by a control structure. This reciprocating pump assembly cycles until the predetermined exchange volume is satisfied (determined by such means as visual or optical comparison of fluid input and output, sensor devices, etc.). The invention permits connection to both a bulk fresh fluid supply and a floor drain, such as those typically found in vehicle repair facilities.

One object of the invention includes a reciprocating pump assembly having a power medium of a pressurized hydraulic fluid, such as used transmission fluid of an operating motor vehicle during a maintenance procedure, or pressurized fresh fluid from an external source.

One object of the invention provides a fluid exchange apparatus released from the requirement of having dedicated on-board fluid reservoirs. A remote bulk fresh fluid supply and remote waste fluid receptacle, such as those found in vehicle repair facilities, may be utilized to practice the present invention. In this manner, a smaller, more compact fluid exchange apparatus is provided.

One object of the present invention permits an efficient change between different fresh fluids (grades, additive packages, etc.) between or during exchange procedures. The limited volumetric capacity of the pump assembly and associated conduit results in a limited amount of the previous different fresh fluid charge held within the exchange apparatus.

Another object of the invention includes a reciprocating pump assembly having an external power source, such as an electric motor, for powering or assisting in the powering of the pump assembly. Additionally, a booster pump assembly may be provided to assist in the exchange procedure for certain hydraulic environments, such as low flow or pressure systems.

Yet another object of the invention provides a boost pump which can be controlled to provide variable levels of fluid pressurization.

Yet another object of the invention provides a boost pump which is fluidly coupled to a used fluid conduit, receiving used fluid from an accessed hydraulic circuit.

Yet another object of the invention provides a boost pump which is fluidly coupled to a fresh fluid conduit, receiving fresh fluid from a fresh fluid source.

Yet another object of the invention provides a range of pump assembly structures for practicing the invention. The pump assembly structures may include a linear pump assembly, a displaced piston/crank assembly, and a rotor pump assembly. These and other objects, features and advantages of the present invention will become apparent to one skilled in the art upon analysis of the following detailed description in view of the drawings.

DESCRIPTION OF THE DRAWINGS

The present invention will be described hereafter in the Detailed Description of Preferred Embodiments, taken in conjunction with the following drawings, in which like reference numerals refer to like elements throughout.

DETAILED DESCRIPTION OF PREFERRED EMBODIMENTS

Figure 1:
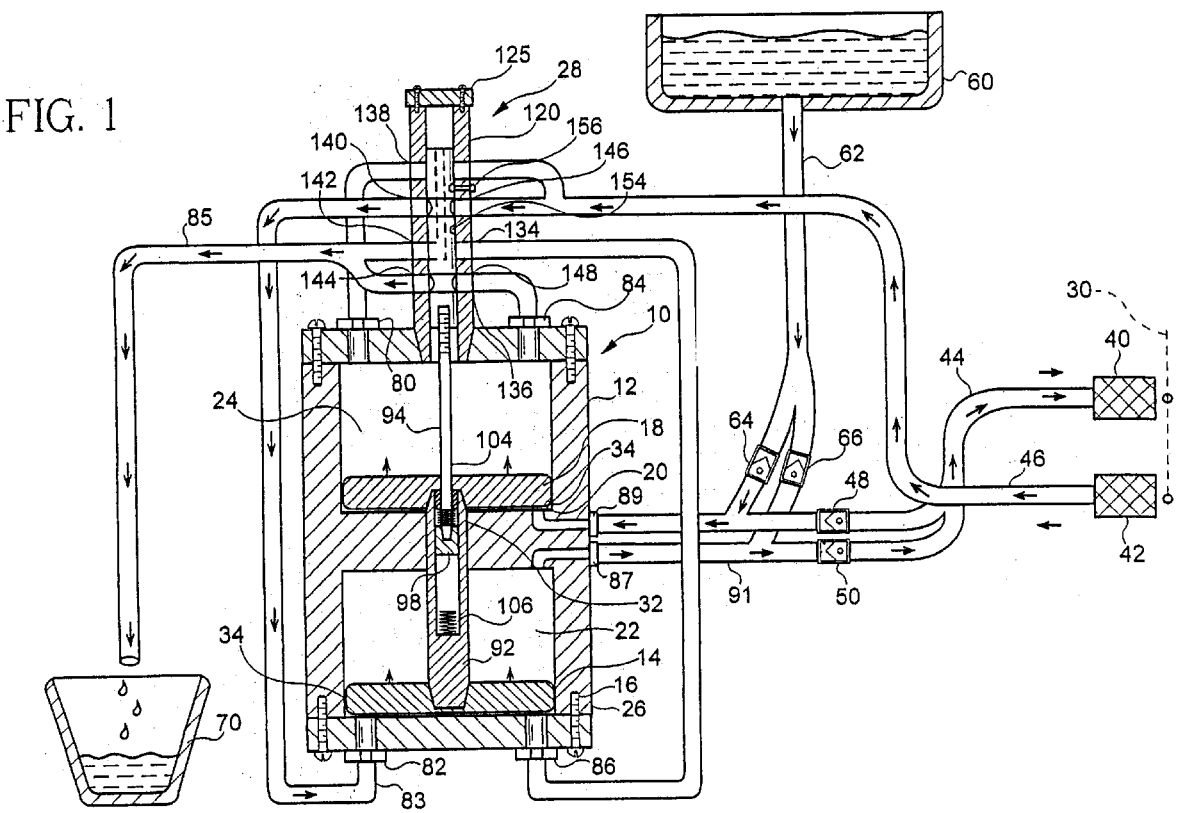
FIG. 1 schematically illustrates a fluid exchange system according to the present invention.

As shown in FIG. 1, the invention of the present application includes a reciprocating pump assembly 10 having a rigid cylinder body 12 and an interiorly-received dual fluid separation structure 14. In this preferred embodiment the dual fluid separation structure 14 is a dual piston 16,18 assembly. The cylinder body 12 and dual piston assembly 14 together define two pumping chambers 20, 22 disposed substantially between the outer piston ends 16, 18 of the dual piston assembly 14. Two working chambers 24, 26 are also defined and are disposed away from the pumping chambers 20, 22 and within the cylinder body 12. The working chambers 24, 26 receive pressurized fluid from an accessed hydraulic circuit 30. Fluid flow relative to the pump assembly 10 is controlled by an actuated control valve assembly 28. The pressurized fluid, used as a power medium to drive the reciprocating pump 10, may be automatic transmission fluid of an operating vehicle. The pumping chambers 20, 22, on the other hand, simultaneously introduce fresh fluid into the accessed hydraulic circuit 30 (e.g., transmission cooling circuit). The pumping chambers 20, 22 are interconnected by a guide bore 32 which passes through the cylinder body 12. In operation, the volumes of each of the chambers 20, 22, 24, 26 are variable and determined by the relative position of the dual piston assembly 14 within the cylinder assembly 12. Minimal fluid is lost across the chamber sealing surfaces 34. Sealing surfaces 34 may include rings or seals as selected by those skilled in the art. In this embodiment, the working chambers 24, 26 are coaxial with the pumping chambers 20, 22. It should be appreciated that the working chambers 24, 26 and pumping chambers 20, 22 are of a substantially cylindrical shape in this preferred embodiment, however, other configurations are possible. Additionally, the dual fluid separation structure 14 could be a dual diaphragm assembly or other structures disclosed hereinafter.

As more fully described herein, the pump assembly 10 is interconnected to an accessed hydraulic fluid circuit 30 through quick-connect fluid couplers 40, 42, fluid conduits 44, 46, and associated unidirectional check valves 48, 50. Used hydraulic fluid from the accessed hydraulic circuit 30 enters the exchange apparatus through quick-connect coupler 42 and a fresh hydraulic fluid flows out of the exchange apparatus and through quick-connect coupler 40. The flow rate of the used and fresh hydraulic fluid is substantially equivalent during the exchange process. The pump assembly 10 is additionally coupled to a bulk fluid reservoir 60 or similar external fresh fluid source through associated fluid conduit 62 and unidirectional check valves 64, 66. The pump assembly 10 is additionally coupled to an external used fluid receptacle 70, such as an oil drain or external tank of typical vehicle maintenance facilities. A flow alignment device, as illustrated in applicant's existing U.S. Pat. No. 5,472,064, may be utilized to practice the present invention. This reference is incorporated herein entirety for all purposes.

Still referring to FIG. 1, a plurality of orifices 80, 82, 84, 86, 87, 89 are interconnected to the pump assembly 10 at the pumping chambers 20, 22 and the working chambers 24, 26, each of which is adapted to provide fluid communication from or into respective pumping chambers 20, 22 or working chambers 24, 26. Working chambers 24, 26 are fluidly coupled to receive used hydraulic fluid from the accessed hydraulic circuit 30 through ports 80 and 82. Working chambers 24, 26 are additionally fluidly coupled to permit discharge of the used hydraulic fluid to the external used fluid receptacle 70 through ports 84 and 86. As described herein, the fluid flow through respective fluid ports 80, 82, 84, 86 is controlled by a spool valve assembly 28. Depending on the local pressure conditions, pumping chambers 20, 22 are fluidly coupled to either the fresh fluid source 60 or the outlet conduit 44.

Figure 2:
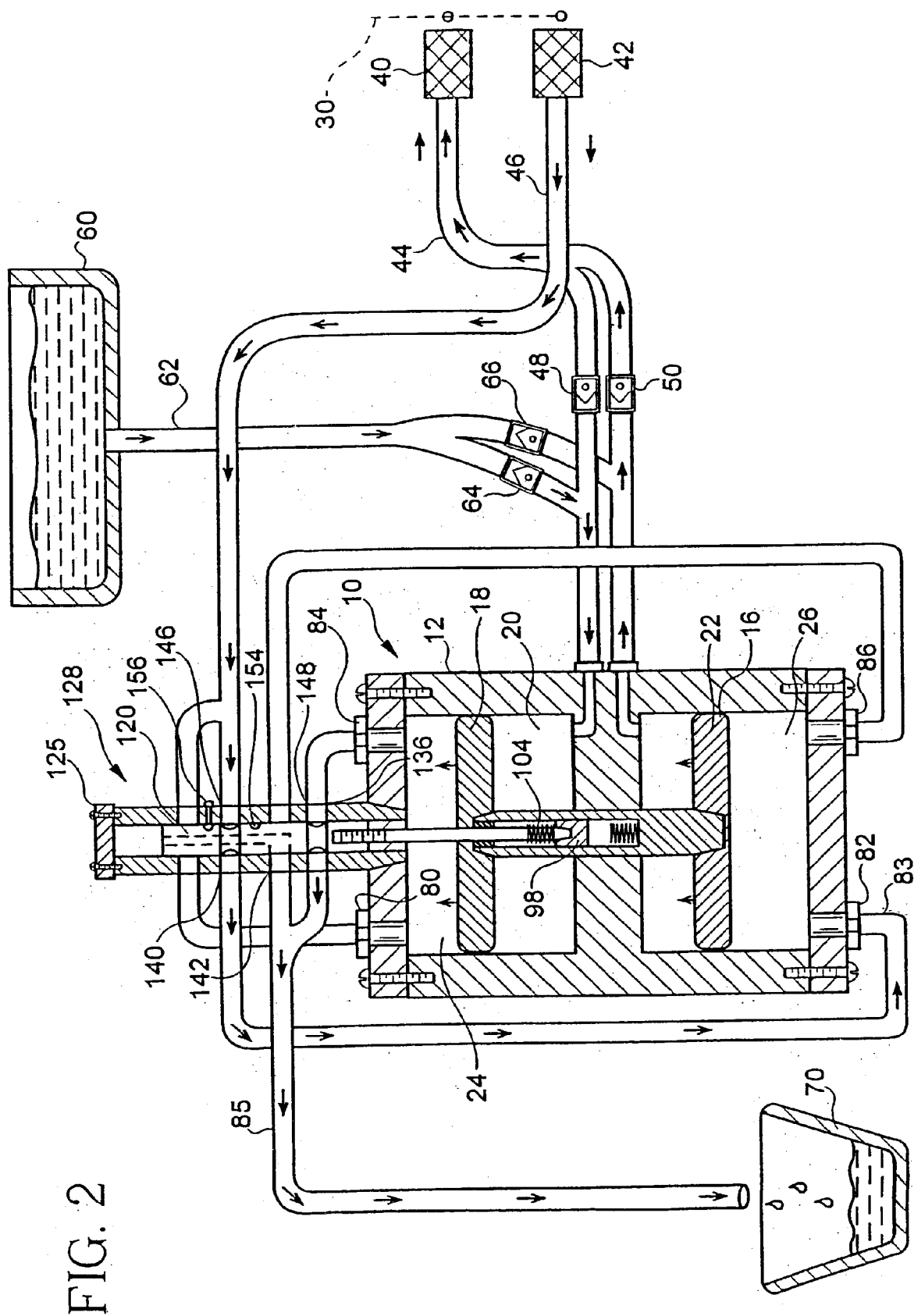
FIG. 2 schematically illustrates the fluid exchange system of FIG. 1 at a later point in time.
Figure 3:
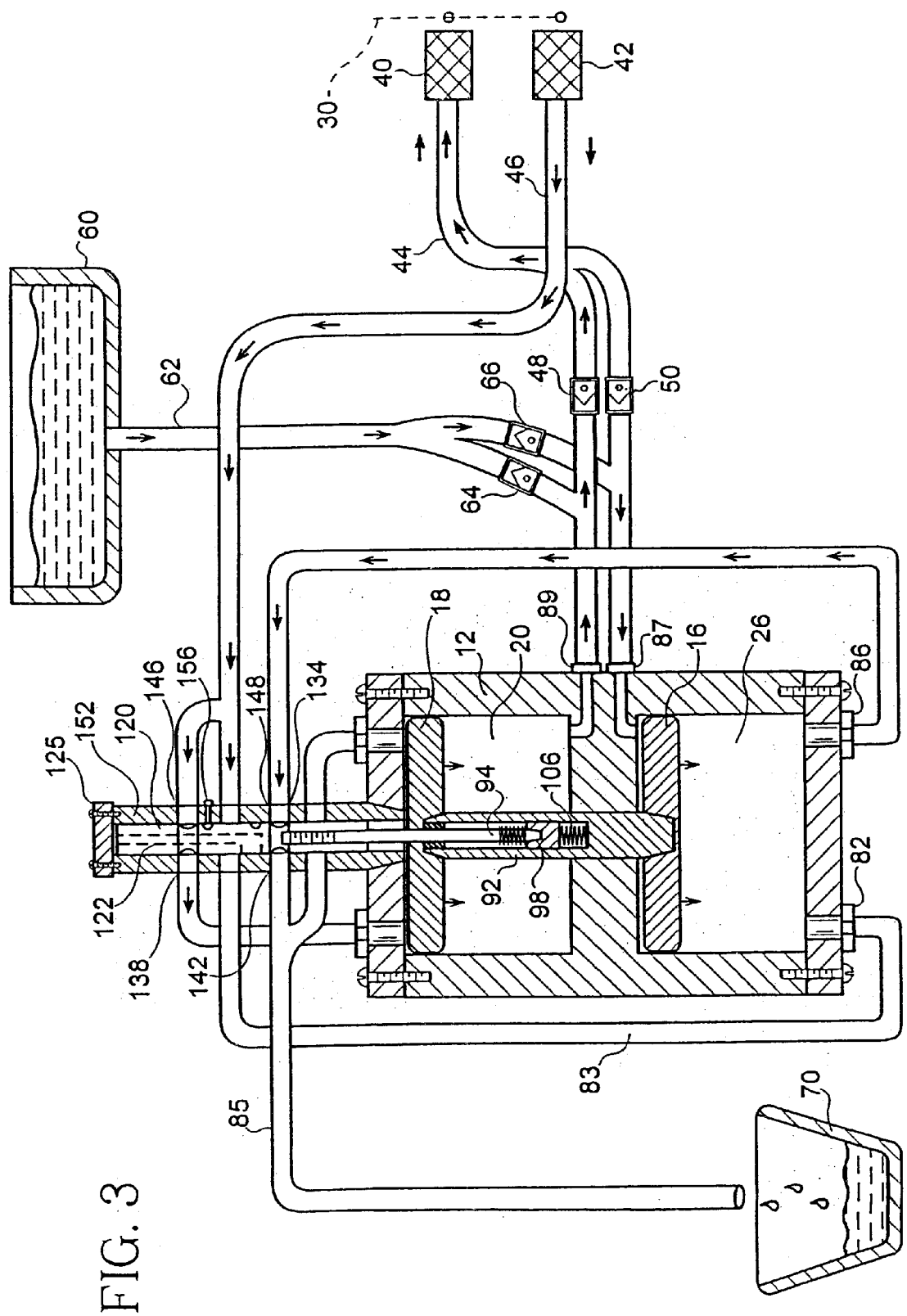
FIG. 3 schematically illustrates the fluid exchange system of FIG. 2 at a later point in time.

In FIGS. 1–3, the present invention is illustrated in schematic, cross-sectional views with arrows schematically depicting fluid flow. Disposed within the cylinder block 12 is the dual fluid separation structure 14, here illustrated as a dual piston structure 16, 18. Alternatively, a dual diaphragm structure (not shown) may be utilized. The diaphragms may be made of a flexible material such as a rubber-like or other conventional material and may be secured or attached by conventional means to the cylinder body 12 in a manner that a seal is formed between the respective working chambers 24, 26 and pumping chambers 20, 22.

Figure 5:
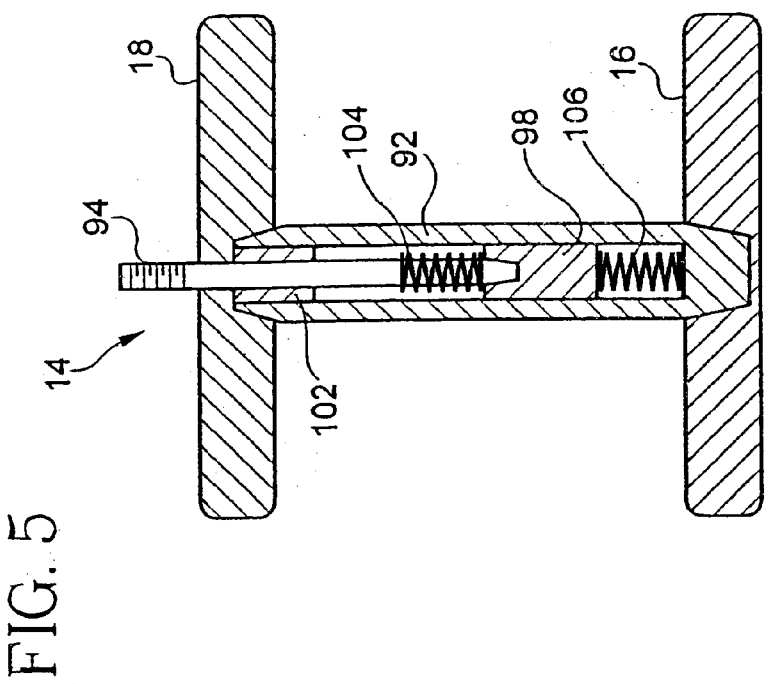
FIG. 5 is an elevational view of particular components of the fluid exchange system of FIG. 1.
Figure 4:
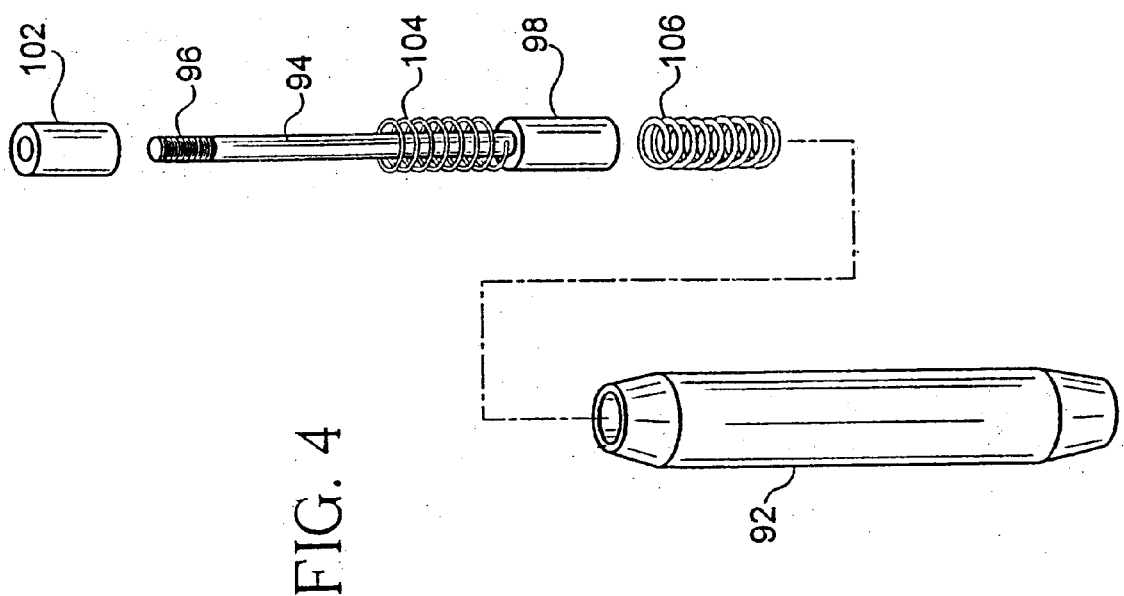
FIG. 4 is an elevational view of particular components of the fluid exchange system of FIG. 1.

Referring now to FIGS. 4 and 5, the dual piston assembly 14 and a control valve actuation assembly 90 are illustrated. The dual piston structure 14 has a rod 92 interconnecting the two opposed pistons 16, 18. The connecting rod 92 is threadedly secured at each end to an associated piston 16, 18. The center rod 92 is hollow and interiorly receives a control rod 94 operatively coupled to the control valve assembly 90. The control rod 94 includes a first end 96 having threads and a second enlarged end 98. The enlarged second end 98 is sized to be slidingly received into the interior of the connecting rod 92. A threaded bushing 102 secures the enlarged end 98 of the control rod 94 within the connecting rod 92. A pair of coil springs 104, 106 are also disposed within the connecting rod 92. The coil springs 104, 106 are disposed at either side of the enlarged portion 98 of the control rod 94. In combination, the control rod 94 (and hence, spool valve 120) is linearly displaced under forces imparted by either of the coil springs 104, 106 as transferred by the dual piston assembly 14.

Figure 6:
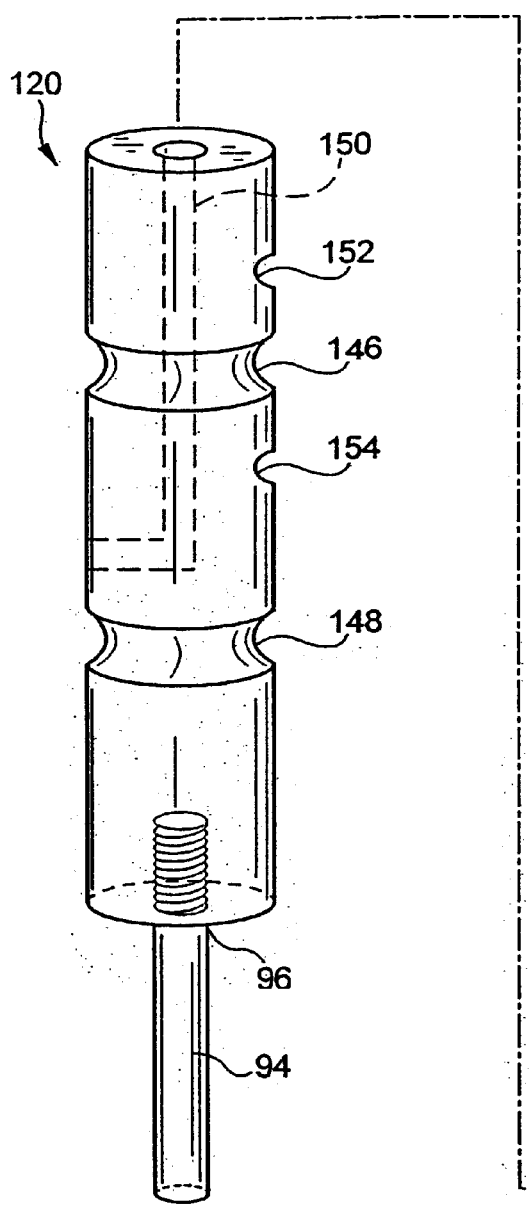
FIG. 6 is a perspective view of particular components of the fluid exchange system of FIG. 1.
Figure 7:
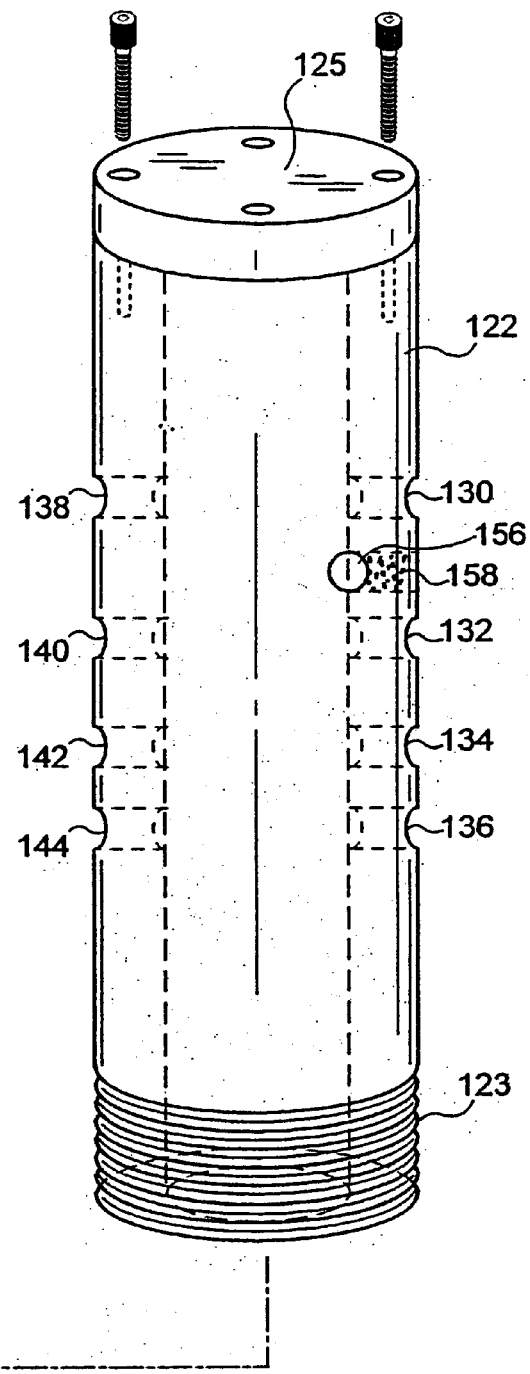
FIG. 7 is a perspective view of particular components of the fluid exchange system of FIG. 1.

Referring now to FIGS. 6 and 7, the control valve assembly 28 for directing fluid flow relative to the pumping assembly 10 is illustrated in perspective view. Control valve assembly 28 includes an actuated spool or spool valve 120, valve body 122 and cap 125. Valve body 122 includes a plurality of ports 132, 134, 136, 138, 140, 142, 144 providing fluid communication through the valve assembly 28. Valve body 122 is threadedly secured at a first end 123 to the cylinder body 12 of the pump assembly 10. Spool valve 120 is slidably received into the valve body 122. Spool valve 120 includes a plurality of concentric fluid passageways 146, 148 which permit fluid to communicate between opposed ports 130 144 of the valve body 122. Additionally, spool valve 120 includes a vent passageway 150 for permitting fluid disposed between the upper face of the spool valve 120 and valve body 122 to be discharged to the used fluid receptacle 70. Alternative venting approaches may be appreciated by those skilled in the art, and include external vents, relief valves, etc.

Still referring to FIGS. 6 and 7, spool valve 120 includes a pair of semi-spherical depressions 152, 154 sized to receive a portion of an encased ball 156 disposed on the valve body 122. The encased ball 156 is inwardly biased by a spring 158 to engage the depressions 152, 154. Together in combination the valve depressions 152, 154, encased ball 156, and spring 158 form a pair of detent stops for limiting the position of the spool valve 120 within the valve body 122. Linear movement of the spool valve 120 results only upon exceeding a resistive force of the detent stops. Upon overcoming the detent reaction force, the spool valve 120 displaces within the valve body 122 until it reacts at either a top or bottom surface of the valve body 122. In this manner, the detent stops tend to restrict the relative position of the spool valve 120 within the valve body 122 to one of two majority positions, illustrated either in FIGS. 1 and 2 or in FIG. 3. Alternative control valve structures may be readily appreciated by those skilled in the relevant arts. One example of a non-piston actuated control structure is described hereinafter with reference to FIG. 8.

Operation of the embodiments of FIGS. 1–7 will now be described. A closed fluid circulation system of an automatic transmission or other hydraulic fluid circuit 30 is accessed to provide fluid interconnection of the invention such that used fluid can be received from the fluid circuit 30 and fresh fluid can be simultaneously introduced by the invention to thereby replace the spent fluid. Suitable adapters (not shown) terminating in quick connectors are utilized to allow quick and convenient connection of conduit to a spent fluid outlet side of the accessed fluid circuit and to the return line side of the fluid circuit. When the internal fluid pump (which pressurizes the fluid circuit) is rendered operative, spent fluid is received into the pump assembly 10 at one of the working fluid chambers 24, 26 selected by the spool valve assembly 28 (based on the existing position of spool valve 120). Referring to FIG. 1 (illustrating fluid conditions immediately after spool valve 120 transitioned to the position of FIG. 1), used fluid from the transmission circuit 30 is introduced into the lower working fluid chamber 26 through port 82 from conduit 83 through the spool valve assembly 28. The used fluid cannot be vented out of the used fluid chamber 26 since the spool valve 28 blocks fluid from port 86. Therefore, as the used fluid enters working fluid chamber 26 through port 82, piston assembly 14 is forced upward. As piston assembly 14 is upwardly displaced, each of the four fluid chambers 20, 22, 24, 26 simultaneously experience a change in volumetric conditions: the upper working fluid chamber 24 is discharging used fluid to a used fluid receptacle 70, the upper pumping chamber 20 is receiving a charge of fresh fluid from the fresh fluid reservoir 60, the lower working chamber 26 is receiving used fluid from the accessed transmission circuit 30, and the lower pumping chamber 22 is introducing fresh fluid into the accessed transmission circuit 30.

More specifically, used fluid in the upper working chamber 24 is forced out of port 84 and through passageway 148 of the control valve 120 and through conduit 85 to the used fluid receptacle 70. Fresh fluid is drawn into the upper pumping chamber 20 from the fresh fluid reservoir 60 through conduit 62 and check valve 64. The lower working pumping chamber 26 is receiving used fluid from the accessed transmission circuit 30 through conduit 46 and passageway 146 of control valve assembly 120. The lower pumping chamber 22 forces new fluid out of port 87 through conduit 91 through check valve 50 through conduit 44 and into the return line side of the accessed transmission circuit 30. Check valve 66 prevents fresh fluid from pumping chamber 22 from flowing back into the fresh fluid reservoir 62 through conduit 63.

FIGS. 2 and 3 schematically illustrate the exchange apparatus of FIG. 1 at later points in time. Piston assembly 14 is illustrated in further upwardly displaced position relative to FIG. 1. Referring to FIG. 2, the control valve assembly 120 remains in its position of FIG. 1, as the second end 98 of the control rod 94 has not yet contacted the lower coil spring 106. As piston assembly 14 nears the end of its motion upward, the coil spring 106 is contacted and compressed which creates an increasing actuation force on the valve spool 120. As piston assembly 14 continues to move upwardly, coil spring 106 is further compressed and overcomes the resistive force of the detent assembly. Referring to FIG. 3, once the detent force is exceeded, the control spool 120 transitions to its upper detented position. This reverses the cycle of the pump assembly 10 and causes the piston assembly 14 to downwardly move under pressure of the used fluid (introduced into the upper working fluid chamber 24 through port 80) from the accessed transmission circuit 30. The piston assembly 14 continues to downwardly move until the second end 98 of the control rod 94 reacts against the upper coil spring 104, biasing the control spool 120 downward back into the position of FIGS. 1 and 2. The cycle illustrated in FIGS. 1–3 thus repeating. This process of utilizing the automatic reversing cycles is repeated until it is determined that the fluid exchange is complete, i.e., upon comparison of the fresh fluid to the used fluid exiting the accessed circuit, exhaustion of fresh fluid reservoir, etc.

Figure 8:
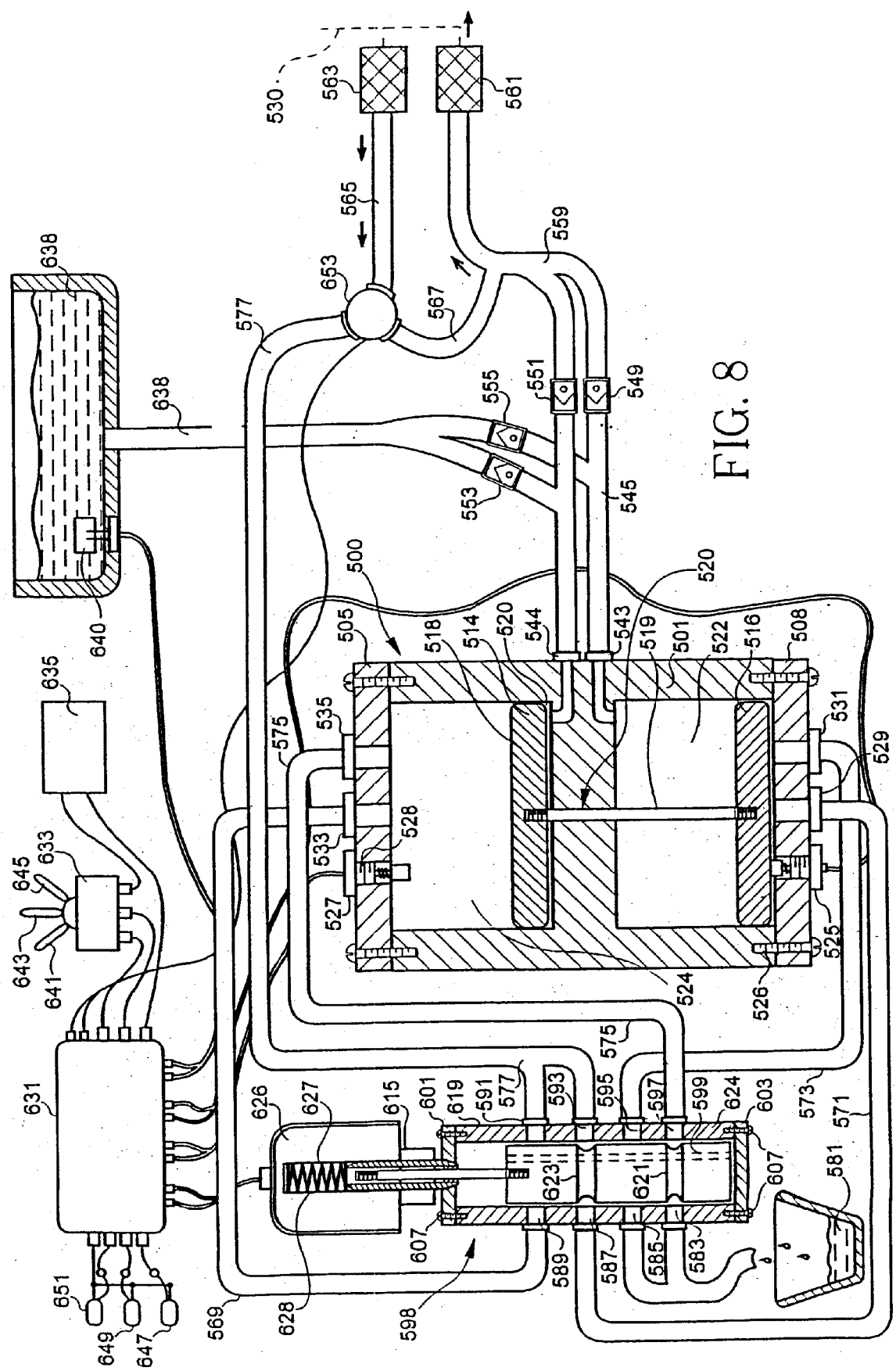
FIG. 8 schematically illustrates a second embodiment of a fluid exchange system according to the present invention.

FIG. 8 illustrates another preferred embodiment of the present invention. Used and fresh fluid flow relative the pump assembly 500 is controlled by a remote controller device and a remote spool valve assembly. A reciprocating pump assembly 500 includes a reciprocating piston assembly 514 disposed within a cylinder body 501. Cylinder body 501 is sealed with a lower cylinder end plate 503 and an upper cylinder end plate 505. End plates 503, 505 are secured by threaded fasteners 507. End plates 503, 505 are sealed to valve body 501 by a thin neoprene gasket material or other known sealing approaches. Connecting rod 519 is threadedly secured to an upper piston 518 and a lower piston 516. Connecting rod 519 is slidably received through guide bore 520 with minimal clearance to promote sealing between the pumping chambers 520, 522. Similarly, pistons 516, 518 are fitted within the cylinder body 501 with minimal clearance to promote sealing without creating excessive friction drag.

Piston 518 defines within the top half of cylinder assembly 501 a working fluid chamber 524 and a pumping fluid chamber 520. Likewise, piston 516 defines within the bottom half of cylinder assembly 500 a working fluid chamber 526 and a pumping fluid chamber 522.

End plate 505 includes two fluid ports: a used fluid power inlet port 533, a used fluid discharge port 535. End plate 505 also includes an access port 528 for receiving a threaded position sensor 527. Fluid port 533 is coupled to a used fluid inlet conduit 569. Port 535 is coupled to a used fluid discharge conduit 575.

Opposite end plate 503 includes two fluid ports: a used fluid power inlet port 529, and a used fluid discharge port 531. End plate 503 also includes an access port for receiving a threaded position sensor 525. Fluid port 529 is coupled to a used fluid conduit 571. Fluid port 531 is coupled to a fluid discharge conduit 573.

A bi-directional fluid channel 537 is provided to the upper half of cylinder body 501 and a bi-directional fluid channel 597 is provided to the lower half of cylinder body 501. Fluid channel 537 is coupled to a fresh fluid two-way conduit assembly 547 through port 544. Channel 539 is connected to a fresh fluid two-way conduit assembly 545 through port 543.

A check valve 553 is disposed between conduit 547 and fresh fluid supply conduit 557. Fresh fluid supply conduit is also connected through check valve 555 to conduit 545. Conduit 545 is coupled to a fresh fluid discharge conduit 559 by a check valve 549. Conduit 559 is connected to conduit 547 by check valve 551.

Conduit 559 is coupled at one end to a female quick connector 561, and a conduit 565 is connected at one end to a female quick connector 563. Conduit 565 is coupled at another end to an electrically-operated three-way flow direction selector valve assembly 653 through an inlet port 659. Valve 653 is coupled to conduit 559 through a fluid bypass outlet port 657. Valve 653 is coupled to a used fluid inlet conduit 577 at an outlet port 655. Conduit 557 is connected to a fresh fluid supply reservoir 638. Reservoir 638 includes a float level switch 640 for signaling a low fluid level condition of the reservoir 638.

A control valve assembly 598 includes a multiple ported valve body 599, and an interiorly-received spool valve 619 maintained between end plates 601, 603. End plates 601, 603 are secured to valve body 599 by threaded fasteners 607. An electric solenoid assembly 626 is disposed relative the valve body 599. Solenoid assembly 626 includes an electric coil 627, and a rod 615 for actuating the spool valve 619. Spool valve 619 includes a circumferential fluid channel 621, a circumferential fluid channel 623, and a vent passage way 624.

Used fluid conduit 575 couples control valve assembly 598 at port 597 to the upper working fluid chamber 524. Used fluid conduit 573 couples control valve assembly 598 at port 595 to the lower working fluid chamber 526. Fresh fluid conduit 577 couples control valve assembly 598 at ports 591, 593 to circuit 530. Used fluid conduit 569 couples control valve assembly 598 at port 589 to the upper working fluid chamber 524. Used fluid conduit 571 couples control valve assembly at port 587 to the lower working fluid chamber 504. A used fluid conduit 579 couples control valve assembly 598 at ports 583, 585 to used fluid receptacle 581.

A microprocessor/controller assembly 631 receives signals from an activation switch 633, position sensors 525, 527 and fluid level sensor 640, and resultantly controls peripheral mechanisms 598, 653. A power supply 635 may be a 12 volt electrical system of the vehicle being serviced. Microprocessor 631 is provided with an LED power-on indicator 647, an LED exchange-on indicator 649, and an LED bypass indicator 651. Switch 633 is shown with three position configurations; a first switch position 641, a second switch position 643; and a third switch position 645.

Valve 653 provides a bypass configuration (fluid conduit 565 coupled to bypass conduit 657) for immediately returning used fluid to the accessed hydraulic circuit and an operative configuration (fluid conduit 565 coupled to conduit 577) for introducing fluid to the pump assembly 500.

Similar to the before described piston-based reciprocating fluid exchanger, the piston based reciprocating pump assembly 500 and the control valve assembly 598 of the fluid exchanger of FIG. 8 can be constructed of a wide range of materials, including aluminum or magnesium alloys, steel alloys, plastic or polymer, and composite materials.

Particular selection of materials for the pump assembly 500 are well within the scope of knowledge possessed by those skilled in the relevant arts.

Fresh fluid supply conduit 638 can be connected to a gravity feed tank system or can be connected to a pressurized fluid feed system. An additional feature may include a pump (not shown) to augment the flow of conduits 559 or 565 (preferably 565 since this tends to be more effective by providing more direct augmentation of low flow through the unit 500). A pump must be arranged to have proper flow alignment with the fluid conduit 565, and may require a variable or fixed bypass. A variable pump would be controllable to provide fluid boost no greater than the output available from the fluid circulation circuit without creating cavitation in the internal pumping mechanism(s) of accessed hydraulic system or any other type of damage such as damage to the integrity of any internal sealing. A fixed boost pump would be set to offset the fluid resistance of the exchange unit.

Additional features of the microprocessor system may include volume of exchange displays, fluid clarity displays, fluid pressure displays, etc. Fluid clarity of the used fluid relative to the new fluid can be monitored for control purposes.

Operation of the microprocessor operated embodiment of FIG. 8:

Fresh fluid reservoir 638 is filled with fresh fluid to activate float switch 640. Power supply 635 is activated. Switch 633 is moved from its position 641 (off position) to position 643 which is its automatic operation. Quick connect couplers 561, 563 are connected to counterpart adapters which are in turn connected, one each to one side of the accessed fluid circulation circuit 530, in this case a fluid cooling circuit of an automatic transmission.

The engine is started and the transmission is placed in Park, Neutral or Drive to render the transmission operative to circulate fluid into its fluid circulation (cooling) circuit or other accessible fluid circuit. Fresh fluid pumping chamber 522 is filled with fresh fluid from the prior fluid exchange and used fluid working chamber 524 is essentially filled with used fluid from the prior fluid exchange. Chambers 520 and 526 are essentially empty of fluid (the chambers could contain reciprocally corresponding fractions of their capacity depending on where the last fluid exchange left piston assembly 514 relative to the cylinder body 501).

Position sensors 525, 527, when contacted by the piston 516, 518 indicate when each corresponding chamber is depleted of used fluid. Sensor 525 signals to microprocessor 631 that chamber 526 is essentially empty of used fluid. Microprocessor 631 activates or deactivates solenoid coil 627 to bias the spool valve 619 to its lower position under power of its return spring 628 (as shown). Spool valve 619 establishes fluid communication between ports 597 and 583 during the venting/exhausting/discharge of the used fluid contained in chamber 524 into receiver 581. Spool valve 619 establishes fluid communication between ports 593 and 587 so that used fluid will be pumped under power of the transmission's fluid circulation pump into chamber 526, which causes chamber 522 to discharge its fresh fluid into conduit 545, through checkvalve 549, conduit 559, and through quick connect 561 to return to the transmission circuit 530. Checkvalve 551 prevents that fresh fluid from chamber 522 from entering chamber 520 and vice-versa when the reciprocating cycle is reversed. Simultaneously with the expulsion of fresh fluid from chamber 522, fresh fluid flows into chamber 520 under the low pressure in chamber 520 caused by the upward movement of piston 518.

Pistons 516, 518 upwardly move until piston 518 contacts position indicator 527 to signal the microprocessor 631 that the chamber 524 depletion of used fluid. The microprocessor deactivates/activates the solenoid 627 to raise spool valve 619 to its upper position, reversing the operations of the reciprocating assembly 500. The timing of this deceleration, stop and reversal of the movement of piston assembly may be dictated by the instructions contained in the memory of microprocessor 631. This reciprocating cycle is continued until completion of the exchange procedure.

Figure 9:
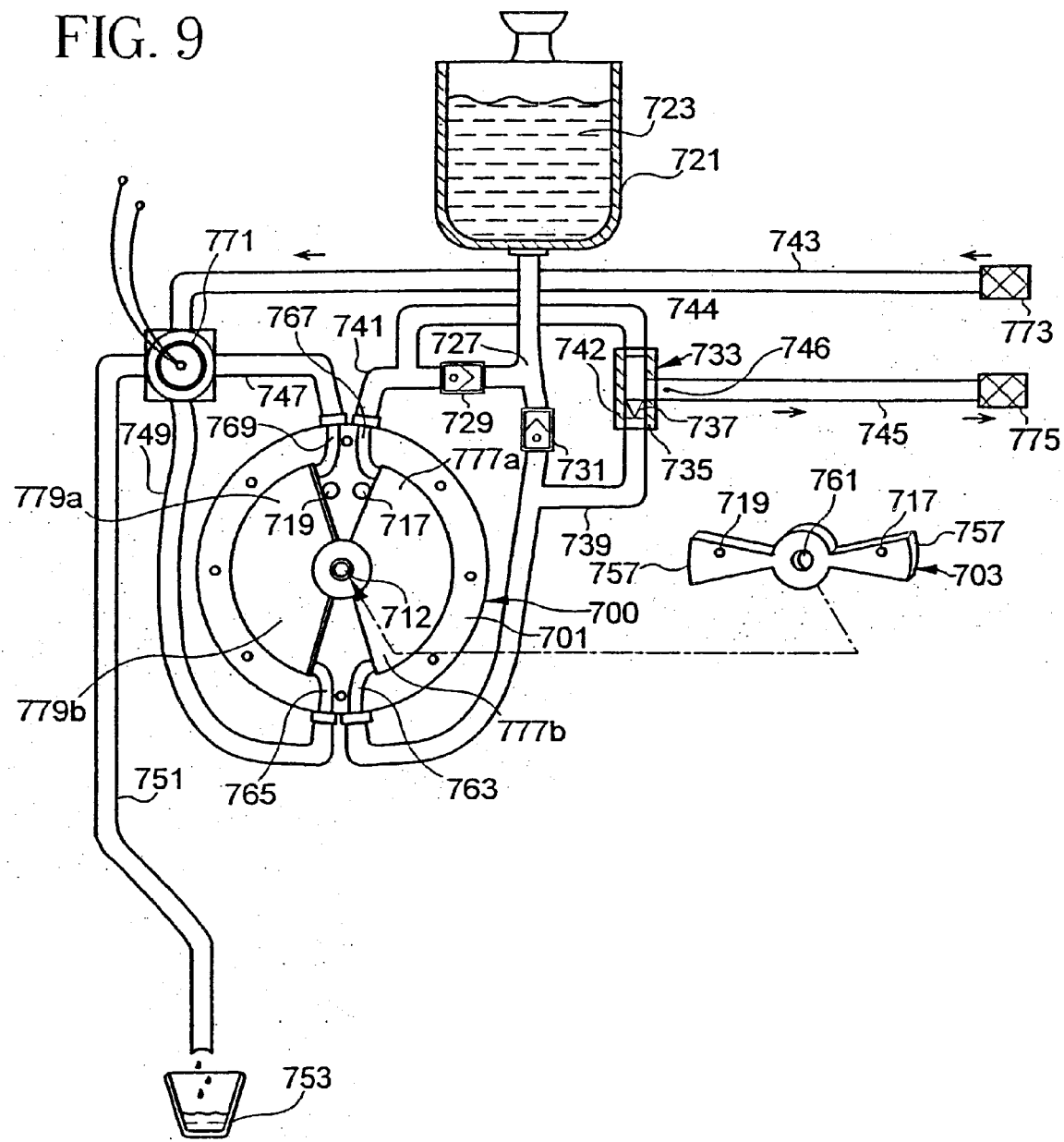
FIG. 9 schematically illustrates a third embodiment of a fluid exchange system according to the present invention
Figure 10:
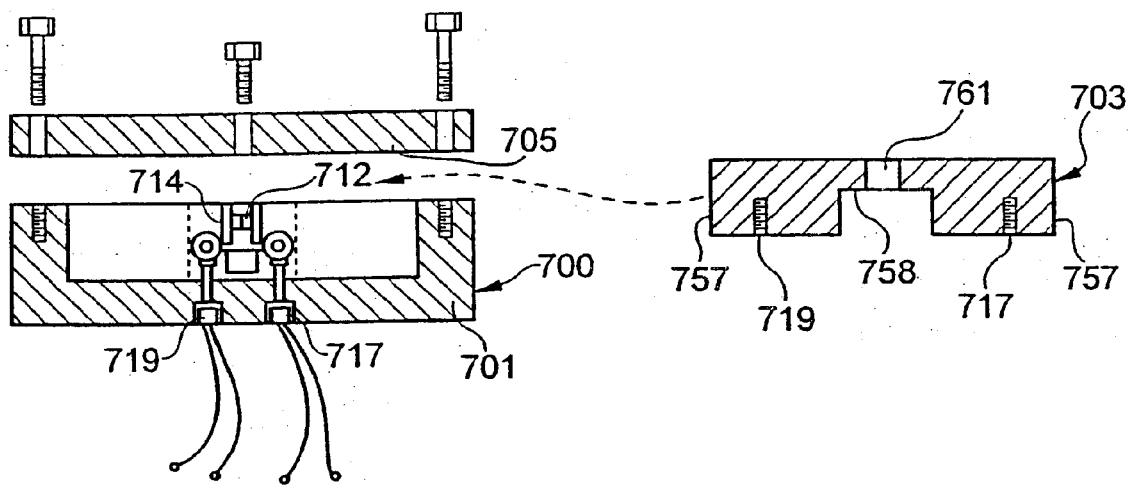
FIG. 10 is an elevational view of particular components of the fluid exchange system of FIG. 9.
Figure 11:
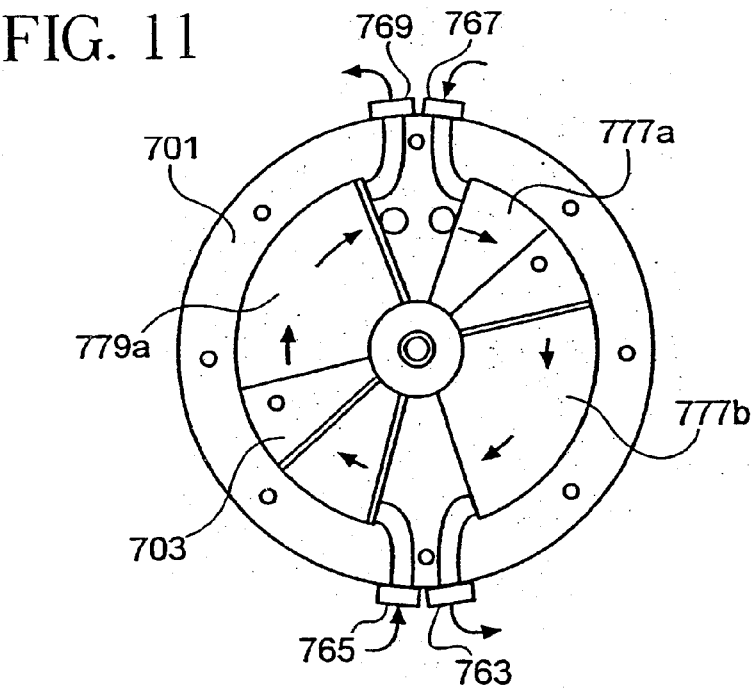
FIG. 11 is an top plan view of particular components of the fluid exchange system of FIG. 9.

FIGS. 9–11 illustrate another preferred embodiment of the present invention. A reciprocator assembly 700 (also shown in Figure B) is includes a rotor assembly 703, a rotor receiving body 701, and a cover member 705. Rotor assembly 703 is received into the body with center aperture 761 of rotor 703 engaging center bearing post 712. Bearing surface 714 engages bearing surface 758 of the retained rotor assembly 703. Rotor assembly 703 has magnetic position sensors 717, 719 to signal the position of the rotor assembly 703 within the body 701 for control purposes.

In combination, the rotor assembly 703, body 701, and cover member 705 together define a pair of working (used) fluid chambers 779 *a, b* and a pair of pumping (fresh) fluid chambers 777 *a, b* As with the earlier-described embodiments, the volumes of the chambers 777, 779 vary with the relative reciprocal position of the rotor 703 within the body 701.

Reciprocator body 701 and rotor 703 are constructed with clearances to allow a relatively free movement of rotor 703 reciprocally within the body 701. In part, sealing between the defined fluid chambers 777, 779 of rotor 703 and reciprocator body 701 is accomplished by minimizing the clearances between rotor sliding surfaces 757 and the body 701.

Reciprocator body 701 has four fluid ports, a pair of bi-directional fresh fluid ports 763, 767, and a pair of bi-directional used fluid ports 765, 769. Fresh fluid port 767 is coupled to a bi-directional fresh fluid conduit 741. Bi-directional used fluid port 769 is coupled to a used fluid conduit 747. Fresh fluid port 763 is coupled to a bi-directional fresh fluid conduit 739. Used fluid port 765 connected to a bi-directional used fluid conduit 749. A fresh fluid reservoir 721 contains a fresh fluid 723. Tank 721 is connected to a fresh fluid fill conduit 727 which is in turn connected to both a check valve 729 and a check valve 731. A controlled four way valve 771 is connected to a used fluid inlet delivery hose 743, *a* used fluid discharge conduit 751, *a* fluid conduit 747 to port 769, and to fluid conduit 749 to port 765. Operation of the valve 771 (mechanically or by a control circuit) controls the introduction of used fluid into the appropriate working fluid chamber 779*a* or 779*b*.

Conduit 751 drains into a used fluid receiver 753. Conduit 743 terminates at a female quick connect 773 which is coupled to the outlet side of an accessed fluid circulation system by suitable adapter means (not shown).

A priority valve assembly 733 includes of a valve body 735 and valve slide 737. Valve body 735 has two ends ports, an end port 744 which is connected to conduit 741 and an end port 742 which is connected to conduit 739. Valve body 735 has a side port 746 which is connected to a fresh fluid outlet delivery hose 745 which terminates at a female quick connect 775. Female quick connect 775 is connected to the return side of the accessed fluid circulation system by suitable adapter means (not shown). The function of the priority valve 733 is to mechanically control the flow of fresh fluid from an appropriate pumping chamber 777 to the output conduit 745.

If desired a boost pump can be used on conduit 743. An electrical pressure differential switch can be used to control the boost pump to prevent excessive fluid flows of the system.

Similar to the operation of the above described exchange structures, the fluid exchange apparatus of FIGS. 9–11 is coupled to an accessed fluid circuit through quick connect couplers 773, 775. Used fluid is introduced into the pump assembly 700 through port 769, or port 765 as controlled by the valve 771. The pressurized used fluid from the accessed fluid circuit reacts within the pump assembly to bias rotor 703 with the fluid chambers 777, 779 experiencing a resulting volumetric change.

Position sensors 717, 719, which may be magnetic sensors or other known sensors, are used to indicate the relative position of the rotor 703 within the body 701. A controller may receive a position sensor signal to appropriately alter the valve 771 to cyclically direct the pressurized used fluid into the working fluid chambers 779 *a, b*.

Figure 12:
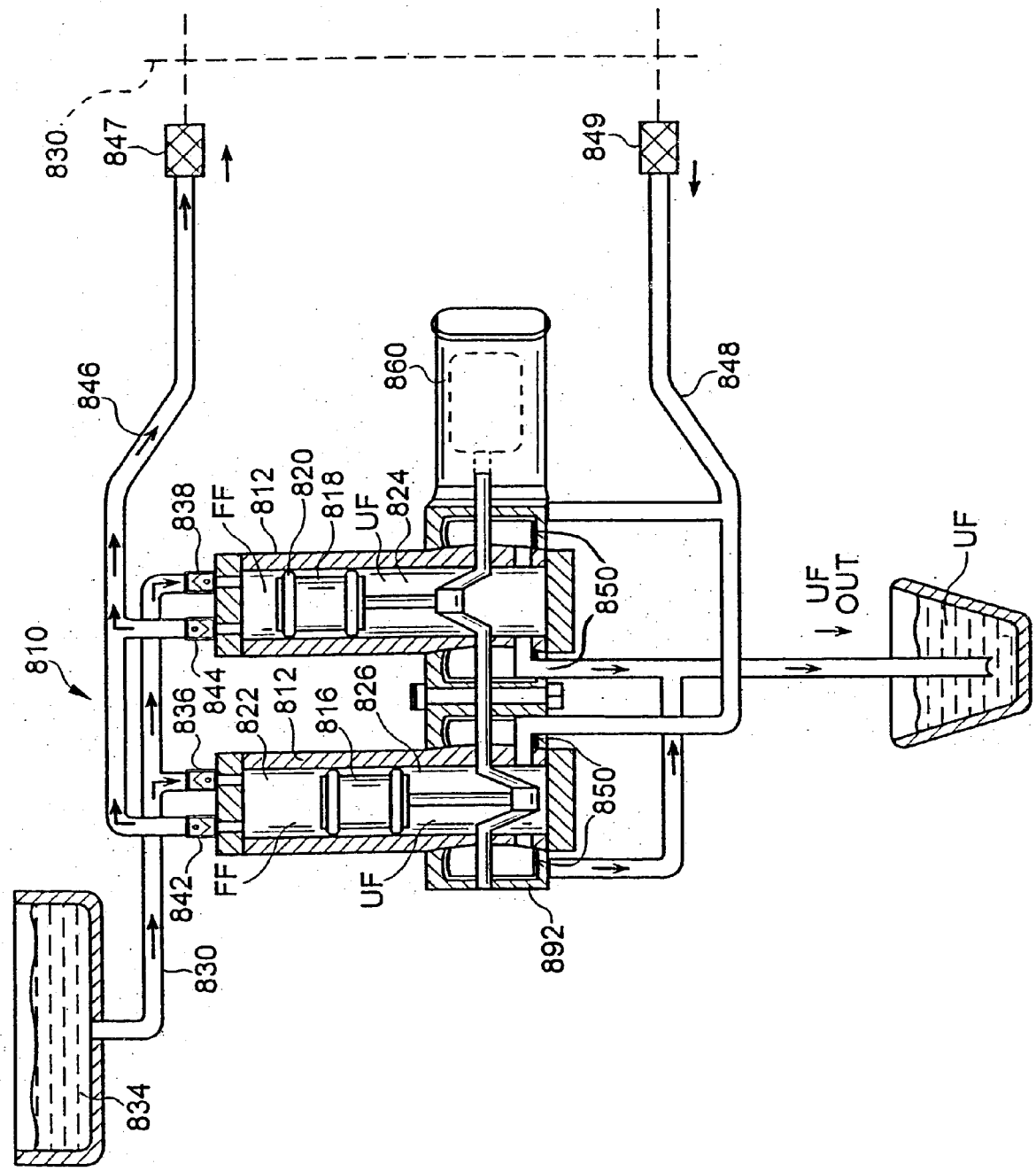
FIG. 12 schematically illustrates a fourth embodiment of a fluid exchange system according to the present invention.

Referring now to FIG. 12, another preferred embodiment of the present invention is illustrated. The pump assembly 810 of this embodiment includes a pair of pistons 816, 818 reciprocating on a crank assembly 892 within a cylinder housing 812. Pumping fluid chambers 820, 822 are defined between the top faces of the pistons 816, 818 and the walls of the cylinder housing 812. Working fluid chambers 824, 826 are defined between the bottom faces of the pistons 816, 818 and the walls of the cylinder chamber 812. Fresh fluid intake into the pumping fluid chambers 820, 822 is through fresh fluid conduits 830 from a fresh fluid reservoir 834. Unidirectional check valves 836 838 control the fluid flow into the pumping fluid chambers 820, 822. Fresh fluid expulsion into the accessed hydraulic fluid circuit is through unidirectional check valves 842, 844, fresh fluid conduits 846 and coupling 847. Piston 816, 818 movement within the cylinder 812 is regulated by the crank assembly 892 so that pistons 816, 818 are displaced in opposite directions (one drawing fresh fluid into the pumping chamber and one expelling fresh fluid in an alternate manner).

Used fluid from the accessed hydraulic fluid circuit 830 via coupling 849 is directed into one or the other working fluid chambers 824, 826 through associated used fluid conduits 848. Rotary valving 850 may be used to control the timing and flow of used fluid into alternating working fluid chambers. The rotary valving 850 may be replaced with alternative valving as appreciated by those skilled in the relevant arts. It is appreciated that the purpose of the valving is to direct used pressurized fluid into a working fluid chamber 824, 826 to drive the associated piston 816, 818 upwardly (and as a result of crank 892 action, drive the other piston 816, 818 downwardly). In this manner, used fluid is being directed into a first working chamber 824 from the accessed hydraulic circuit 830, used fluid is being expelled into a used fluid receptacle 881 by the other working chamber 826, and simultaneously, fresh fluid is alternatively being drawn into the pump assembly 810 into a first pumping chamber 820, and fresh fluid is being expelled into the accessed hydraulic circuit 830 by a second pumping chamber 822. The cyclic procedure continuing until interruption by the operator, fresh fluid reservoir depletion, etc. An additional feature of the system may include an auxiliary power supply 860 for assisting in the pumping process. Such a power supply 860 may be an electric motor (constant or variable speed) directly or intentionally coupled to the crank assembly. An electric motor may be controlled via a control system (not shown) or a mechanical clutch system to provide a fluid boost when required. Operation of the auxiliary power supply 860 may thus be limited to particular hydraulic circuit systems requiring boost power to effect the fluid exchange.

Figure 13:
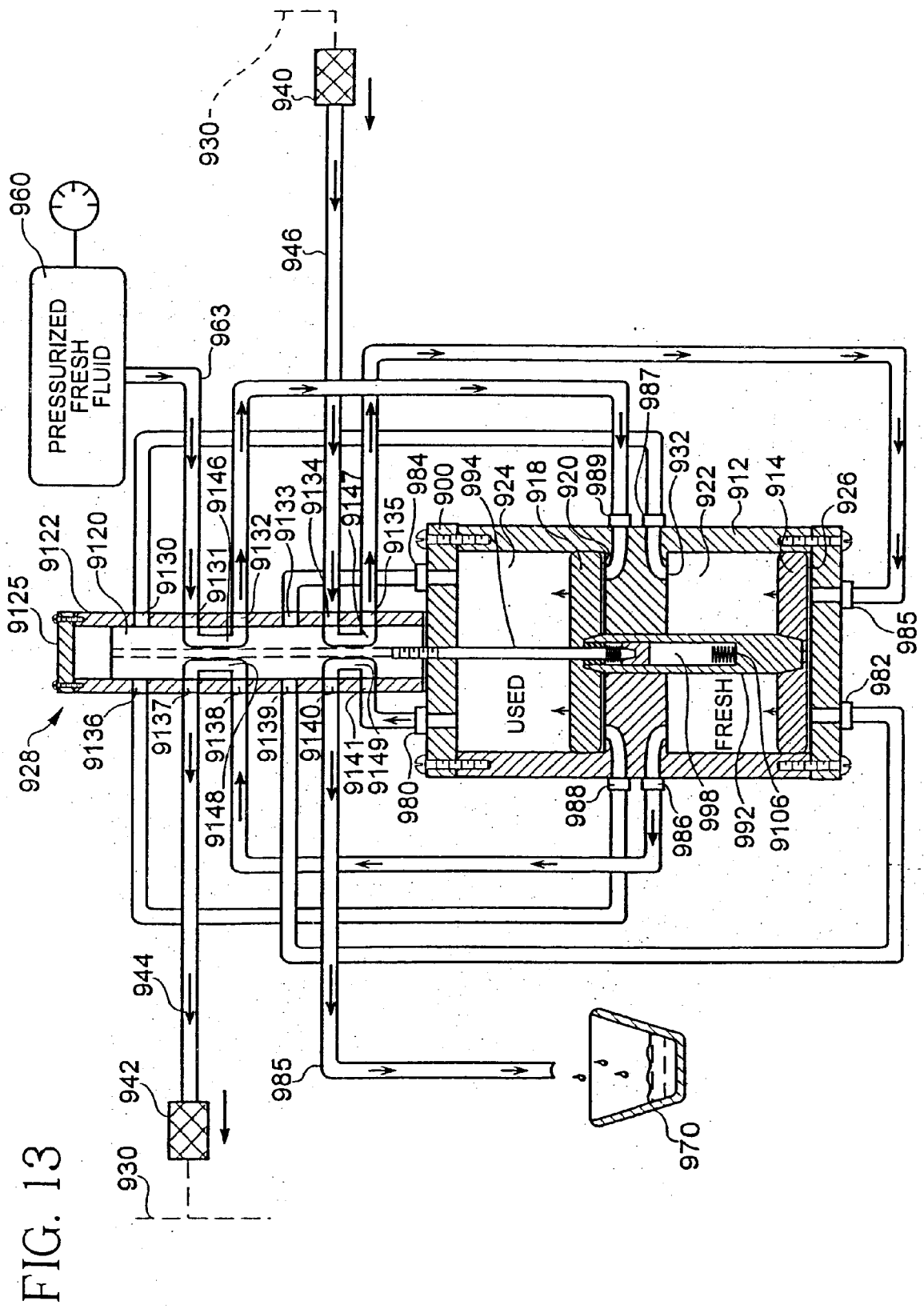
FIG. 13 schematically illustrates a fifth embodiment of a fluid exchange system according to the present invention.
Figure 14:
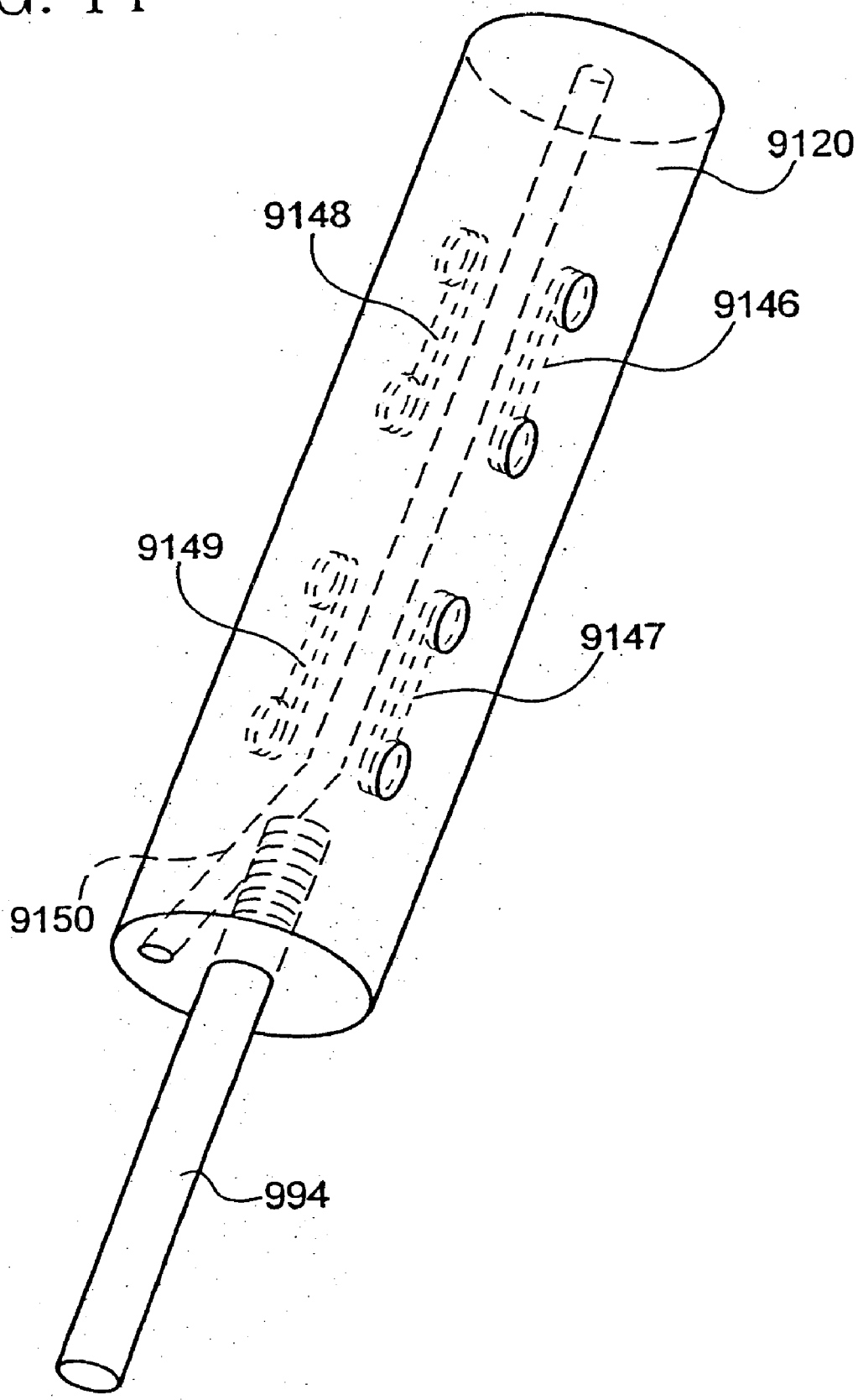
FIG. 14 is a perspective view of particular components of the fluid exchange system of FIG. 13.

Yet another embodiment of the present invention is illustrated in FIGS. 13 & 14. The invention of the present application includes a reciprocating pump assembly 900 having a rigid cylinder body 912 and an interiorly-received dual fluid separation structure 914. In this preferred embodiment the dual fluid separation structure 914 is a dual piston 916, 918 assembly. The cylinder body 912 and dual piston assembly 914 together define two fresh fluid working chambers 920, 922 disposed substantially between the outer piston ends 916, 918 of the dual piston assembly 914. Two used fluid pumping chambers 924, 926 are also defined and are disposed away from the working chambers 920, 922 and within the cylinder body 912. The working chambers 920, 922 receive pressurized fluid from a pressurized fresh fluid reservoir 960. Fluid flow relative to the pump assembly 900 is controlled by an actuated control valve assembly 928. The pressurized fluid, used as a power medium to drive the reciprocating pump 910, may be supplied by an external source. The pumping chambers 924, 926, on the other hand, simultaneously expel used fluid into the used fluid receptacle 970 from the circuit 930. The working chambers 920, 922 are interconnected by a guide bore 932 which passes through the cylinder body 912. In operation, the volumes of each of the chambers 920, 922, 924, 926 are variable and determined by the relative position of the dual piston assembly 914 within the cylinder assembly 912. In this embodiment, the working chambers 920, 922 are coaxial with the pumping chambers 924, 926. It should be appreciated that the working chambers 920, 922 and pumping chambers 924, 926 are of a substantially cylindrical shape in this preferred embodiment, however, other configurations are possible.

The pump assembly 900 is interconnected to an accessed hydraulic fluid circuit 930 through quick-connect fluid couplers 490, 942, and fluid conduits 944, 946. Used hydraulic fluid from the accessed hydraulic circuit 930 enters the exchange apparatus through quick-connect coupler 940 and a fresh hydraulic fluid flows out of the exchange apparatus and through quick-connect coupler 942. The flow rate of the used and fresh hydraulic fluid is substantially equivalent during the exchange process. The pump assembly 900 is additionally coupled to a bulk fluid reservoir 960 or similar external fresh fluid source through associated fluid conduit 962. The pump assembly 900 is additionally coupled to an external used fluid receptacle 970, such as an oil drain or external tank of typical vehicle maintenance facilities. A flow alignment device, as illustrated in applicant's existing U.S. Pat. No. 5,472,064, may be utilized to practice the present invention.

Still referring to FIG. 13, a plurality of orifices 980, 982, 984, 985, 986, 987, 988, 989 are interconnected to the pump assembly 900 at the pumping chambers 924, 926 and the working chambers 920, 922, each of which is adapted to provide fluid communication from or into respective chambers. Working chambers 920, 922 are fluidly coupled to receive fresh hydraulic fluid from the hydraulic source 960 through ports 987 and 989. Working chambers 920, 922 are additionally fluidly coupled to permit discharge of the fresh hydraulic fluid to the accessed hydraulic circuit 930 through ports 986 and 988. As described herein, the fluid flow through respective fluid ports is controlled by a spool valve assembly 928. Depending on the local pressure conditions, pumping chambers 924, 926 are fluidly coupled to either the used fluid receptacle 970 or the inlet conduit 946.

Control valve assembly 928 includes an actuated spool or spool valve 9120, valve body 9122 and cap 9125. Valve body 9122 includes a plurality of ports 9132, 9134, 9136, 9138, 9140, 9142, 9144 providing fluid communication through the valve assembly 928. Spool valve 9120 is slidably received into the valve body 9122. Spool valve 9120 includes a plurality of concentric fluid passageways 9146, 9147, 9148, 9149 which permit fluid to communicate between opposed ports of the valve body 9122. Additionally, spool valve 9120 includes a vent passageway 9150.

The closed fluid circulation system of an automatic transmission or other hydraulic fluid circuit 930 is accessed to provide fluid interconnection of the invention such that used fluid can be received from the fluid circuit 930 and fresh fluid can be simultaneously introduced by the invention to thereby replace the spent fluid. Suitable adapters (not shown) terminating in quick connectors are utilized to allow quick and convenient connection of conduit to a spent fluid outlet side of the accessed fluid circuit and to the return line side of the fluid circuit. Fresh fluid (pump power medium) is received into the pump assembly 910 at one of the working fluid chambers 920, 922 selected by the spool valve assembly 928 (based on the existing position of spool valve 9120). Referring to FIG. 13, used fluid from the transmission circuit 930 is introduced into the lower pumping fluid chamber 926 through port 985. The used fluid cannot be vented out of the used fluid chamber 926 since the spool valve 928 blocks fluid from port 982. As the fresh fluid enters working fluid chamber 920 through port 989, piston assembly 914 is forced upward (FIG. 13 depicts the condition of the spool valve 928 immediately subsequent to its transition). As piston assembly 914 is upwardly displaced, each of the four fluid chambers 920, 922, 924, 926 simultaneously experience a change in volumetric conditions: the upper pumping fluid chamber 924 is discharging used fluid to a used fluid receptacle 970, the upper working chamber 920 is receiving a charge of fresh fluid from the fresh fluid reservoir 960, the lower pumping chamber 926 is receiving used fluid from the accessed transmission circuit 930, and the lower working chamber 922 is introducing fresh fluid into the accessed transmission circuit 930.

Figure 15:
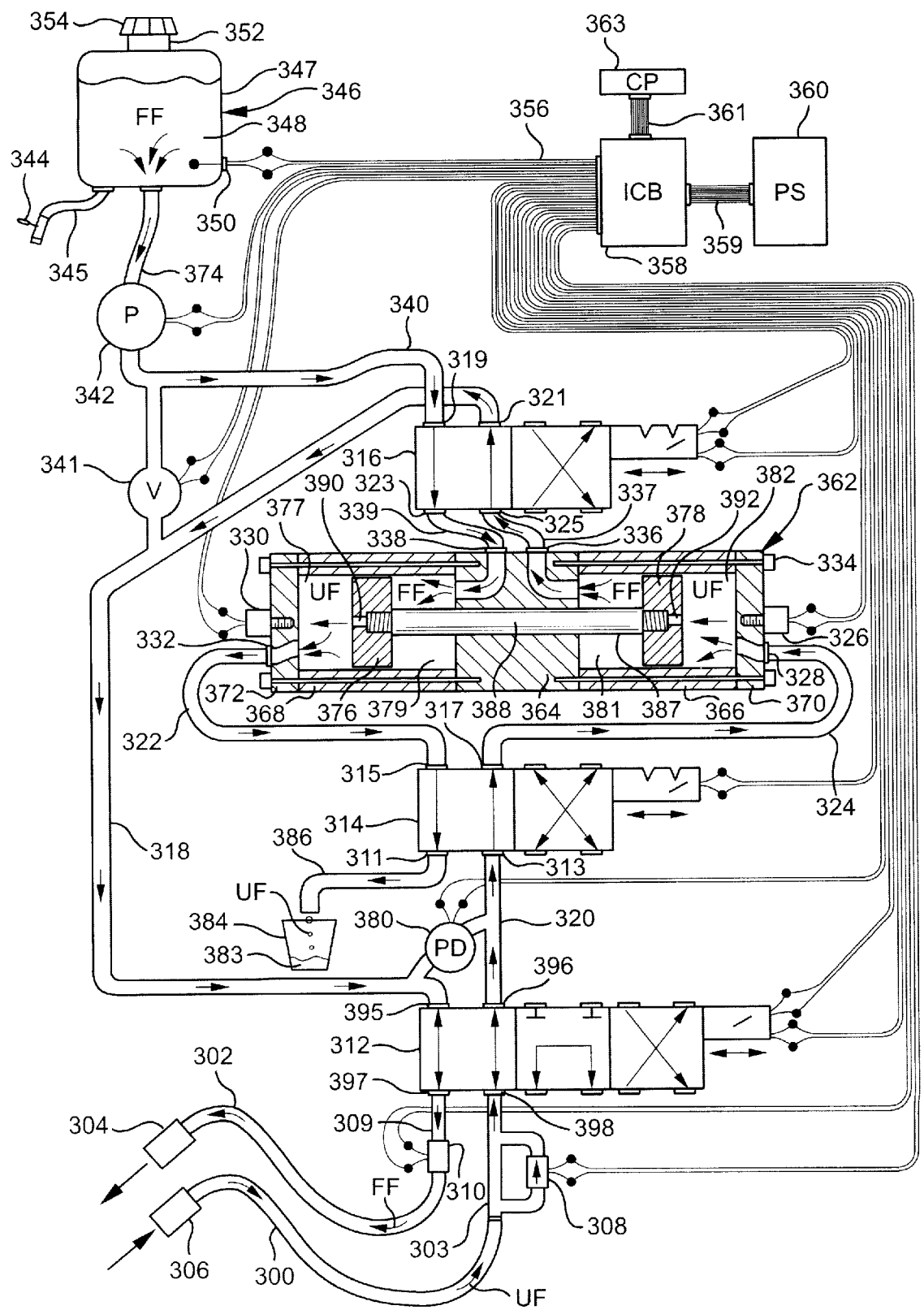
FIG. 15 is a schematic illustration of another embodiment of a fluid exchange system according to the present invention.

As shown in FIG. 15, another embodiment of the invention is provided. This embodiment includes a reciprocating pump assembly 362 defining four variable volume fluid chambers for receiving or expelling fresh or used fluid as further described herein. Fluid from an accessed hydraulic circuit is received into and delivered from the exchange device of FIG. 15 via suitable adapters 304, 306 and conduits 300, 302. Fluid is operatively routed within the exchange device via valves 312, 314, and 316 as commanded by a controller 358. As described in more detail hereinafter, valves 314 and 316 are controlled in tandem manner to direct used and fresh fluid to and from appropriate chambers 377, 379, 381, 382 of the exchange pump 362. Alignment of the flow of used fluid within the accessed hydraulic circuit with the exchange device is provided by a flow alignment mechanism, including flow valve 308, pressure sensor 310, valve 312, and controller 358, which may be provided upon a printed circuit board assembly. Controller 358 may include a variety of known control devices, including but not limited to discrete microprocessor-based controller, programmable logic controllers, etc. Selection and utilization of a particular alternative controller 358 would be appreciated by those skilled in the relevant arts. A boost pump 342 is provided to augment the flow of fresh fluid within the exchange device. The boost pump 342 may be controlled via the controller 358, as further described herein. Pressurized fluid used as a power medium to drive the reciprocating pump 362 may be automatic transmission fluid of an operating vehicle and fresh transmission fluid delivered by boost pump mechanism 342.

The pump assembly 362 has a pair of rigid cylinders 366, 368, a pair of rigid heads 370, 372 with a center rigid cylinder block 364. Four cylinder/head bolts 334 are inserted through correspondingly arranged holes in cylinders 366, 368 and cylinder heads 370, 372 and suitably secured with block 364. Pump 362 has a pair of interiorly-received fluid separation structures, pistons 376, 378, which are rigidly linked by a connecting rod 387 slidably received through bore hole 388. Rod 387 has threaded ends which are secured within pistons 376, 378. Bore hole 388 is finished in such manner so as to provide a relatively close fit and acceptable seal in combination with rod 388 and without excessive frictional drag to impede operation of pump 362. Block 364 has two fresh fluid ports 336, 338 providing fluid communication between conduits 337, 339 and a pair of inner chambers 381, 379, respectively. Head 370 has a used fluid port 328 providing fluid communication between fluid conduit 324 and outer chamber 382. Similarly, head 372 has a used fluid port 332 providing fluid communication between conduit 322 and outer chamber 377. A variety of seals and sealing systems can be selected by those skilled in the art which are resistant to hydraulic fluids.

Each piston 376, 378 has a magnet 390, 392 which operatively cooperates with a position sensor 330, 326. Position sensors 330, 326 signal the controller 358 when the piston 376, 378 approaches the sensor 330, 326 and reaches the extent of its range of motion. In this embodiment cylinders 366, 368, heads 370, 372, block 364, pistons 376, 378, and connecting rod 387 are constructed of aluminum alloy for its strength, ease of machining and/or casting and magnetic neutrality, assuring good function of the magnetically operated position sensors. Many other suitable materials are available to be selected by one skilled in the art such as suitably chosen pressure and fluid resistant plastics. Steel could be used as long as the position sensors and magnetic triggers are somewhat isolated from the steel by used of magnetically neutral inserts around such items, such as brass or magnetically neutral alloys. Sealing used for cylinder to head and cylinder to block sealing is the use of large O-rings in cylindrically machined grooves (not shown). Other types of suitable sealing such as hydraulic fluid resistant RTV type sealer can be selected by one skilled in the art, depending on the specific operating temperatures and pressures. In this case fluorocarbon composition O-rings are used for temperature resistance, multi fluid resistance and durability.

The pair of outer chambers 377, 382 are disposed away from the pair of inner chambers 379, 381. The outer chambers 377, 382 alternatively receive pressurized used fluid from an accessed fluid circulation circuit (not shown) and alternatively discharge the used fluid to a used fluid receiver 384. Inner chambers 379, 381 alternatively receive pressurized fresh fluid from a fresh fluid delivery pump mechanism 342, which draws and pressurizes a fresh fluid 348 from a fresh fluid supply tank assembly 346 through a fresh fluid conduit 374 and then through a fresh fluid conduit 340. The inner chambers 379, 381 introduce the fresh fluid 348 into the accessed fluid circulation circuit being serviced (not shown, e.g., transmission cooling circuit).

Used and fresh fluid flows relative to pump 362 are controlled by a pair of controller 358 actuated flow direction control valves 314, 316, including a used fluid distribution valve 314 and a fresh fluid distribution valve 316. Both of these valves 314, 316 are two position, four-way dual electric solenoid operated spool valves with detents, and are coordinated by a conroller provided upon an integrated circuit board assembly 358. Valves 314, 316, when unpowered, will stay in the previously activated position due to their detents. Of course, there are many other automatically actuated valves or valve combinations which could be selected and arranged to have similar, suitable, and equivalent functions, including but not limited to compressed air or gas, or hydraulic fluid operated valves, or many possible combinations and/or other types of electrically actuated valves, with such valves arranged multiply in a conduit system or as a part of a manifold system.

In operation, the volumes of each of the chambers 377, 379, 381, 382 are variable and determined by the relative position of the dual piston/rod assembly 376/387/378 within the dual cylinder assembly 372/368/364/366/370. Minimal fluid is lost across the sealing surface at the interface between the cylinders 366, 368 and pistons 378, 376 due to precision machining and surface finishing. In this embodiment, a clearance between rod 387 and bore 388 of approximately 0.010 inch is utilized. No piston rings are used in this application for sealing but such could be used for higher pressure applications and are known by those skilled in the art. Of course, a wide assortment of many acceptable types of seals and sealing systems on the outside circumference of pistons 376, 378 in addition to piston rings can be selected by those skilled in the art. In this embodiment, the outer chambers 377, 382 are coaxial with the inner chambers 379, 381. It should be appreciated that the outer chambers 377, 382 and inner chambers 379, 381 are of a cylindrical shape in this preferred embodiment, however, other configurations are possible. Additionally, the dual fluid separation structure of pistons 376, 378 could be diaphragm assemblies of other structures. The diaphragms may be made of a flexible material such as a rubber-like or other conventional material which is resistant to hydraulic fluid or the specific types of fluid that will be exchanged by the invention, and which have the desired temperature capabilities for each specific application, such as are known by those skilled in the art.

The flow rates and volumes of the used and fresh fluids passing through exchange pump 362 are substantially equivalent during the exchange process. Pump 342 is a variable speed 12 volt DC powered centrifugal pump. The outlet pressure of pump 342 can be controlled by integrated circuit board 358 through a main wiring harness 356, in response to signals received from a pressure differential switch 380 which is arranged intermediate to the fluid conduits 318, 320. Pressure differential switch 380 is a dual indicating switch, indicating which conduit 318, 320 is at higher pressure. The switch 380 senses an approximately 5 psi (pounds per square inch) difference, but higher pressure applications may require a greater pressure difference. Integrated circuit board 358 contains a microprocessor system controlled by software fixed in to memory circuits with various electronically controlled electric switching devices, a progressive stepwise electronic rheostat control mechanism for pump 342, and circuits to receive electronic signal inputs and to make electric and electronic outputs (not shown but understood by those skilled in the art). Of course many other pump types and configurations can be used to provide variable output, including but not limited to fixed current electrically powered vane pump or gerotor gear pump with an electronically controlled variable resistance relief circuit.

Pump 342 can be operated and controlled to sufficiently pressurize the fresh fluid in conduit 318 to approximately balance the pressure of used fluid in conduits 318, 320, i.e., pump 342 may be utilized to "cancel out" a pressure differential which might otherwise result from the application of the fluid exchanger. This in effect can minimize the fluid resistance of the fluid exchanger and allow the accessed fluid circulation circuit's fluid to be exchanged without significantly affecting the flow rate of fluid within the accessed fluid circulation circuit.

In some applications it may be useful to utilize pump 342 to pressurize the fresh fluid in conduit 318 to a pressure slightly higher than that required to merely cancel out the total resistance of the fluid exchanger. In this way, the time needed to complete the fluid exchange may be shortened. This is an important consideration when accessing and exchanging the fluid of low flow fluid circulation circuits, especially when exchanging the fluid of small and/or low flow automatic transmissions such as found in Toyotas, Geo Metros, for example. Some of these low flow transmissions may not generate enough pressure to operate the fluid exchanger unless additional fluid boost means is used to augment the powering of the exchange pump 362.

Valve 316 controls the distribution of fresh fluid to and from exchange pump 362. A fresh fluid conduit 339 connects a valve port 323 of valve 316 to port 338 of the exchange pump 362. A fresh fluid conduit 337 connects a valve port 325 of valve 316 to port 336 of exchange pump 362. Valve 316 functions to distribute fresh fluid 348 dispensed from tank 347 through conduit 374, pump 342, conduit 340 and through either inlet port 319 or inlet port 327, depending on the controlled position of the valve 316. Fresh fluid introduced at inlet port 319 is passed through outlet port 323 and through conduit 339 and into port 338 of the exchange pump 362. Port 338 is in fluid communication with inner chamber 379. Pressurized fresh fluid introduced at port 338 fills chamber 379. When valve 316 is transitioned into its second position (not shown), fluid introduced at inlet port 319 is passed into conduit 337 and into port 336 of the exchange pump 362. Port 336 is in fluid communication with working chamber 381. Pressurized fresh fluid introduced at port 336 fills working chamber 381. As the fresh fluid in the working chamber 379 or 381 which is being filled is pressurized above the pressure of used fluid in the outer chambers 377, 382, the piston/connecting rod assembly 376, 387, 378 is biased in a direction depending upon which of the chambers 379 or 381 is being filled with pressurized fresh fluid. In the illustrated embodiment, the valve 316 is controlled via an integrated circuit board controller assembly 358 which is connected electrically to the electric solenoids of valve 316 (not shown) by main wiring harness 356.

Valve 316 also distributes fresh fluid from the inner chamber 379 or 381 which is not being filled by pressurized fresh fluid to conduit 318. In FIG. 15, fresh fluid from inner chamber 381 is being forced by action of the piston/ connecting rod assembly 376, 387, 378 through conduit 337 and into conduit 318. When the valve 316 transitions to its second operational position, fresh fluid from inner chamber 379 will be forced by action of the piston/connecting rod assembly 376, 387, 378 through conduit 339 and into conduit 318.

Used fluid flow to exchange pump 362 is controlled by a second actuated control valve, a used fluid distribution valve 314, which controls the used fluid flow to pump 362. Valves 314, 316 may be an identical valve assembly. Valve 314 is a two position four-way dual solenoid operated with detent. A used fluid conduit 322 connects a valve port 315 of valve 314 to port 332. A used fluid conduit 324 connects a valve port 317 of valve 314 to port 328. Valve 314 functions to distribute used fluid from the accessed fluid circulation circuit to the outer chambers 377, 382. Used fluid from the accessed fluid circulation circuit is received by the valve 314 via used fluid conduit 320. Conduit 320 is coupled to valve 314 via port 313. Used fluid from conduit 320 passes through the valve 314 to either port 317 or port 315, depending on the controlled position of the valve assembly 314. In FIG. 15, conduit 320 is fluidly coupled (via ports 313, 317) to conduit 324. In a second mode of valve 314 operation (not shown), used fluid conduit 320 is fluidly coupled (via ports 313, 315) to conduit 322. Similar to valve 316, valve 314 is controlled via integrated circuit board controller assembly 358 through main wiring harness 356.

A used fluid discharge conduit 386 is connected to valve 314 at port 311. Used fluid conduit 386 receives used fluid from the exchange pump 362 via either conduit 322 or 324. In FIG. 15, conduit 386 is fluidly coupled to conduit 322. In a second mode of valve 314 operation (not shown) conduit 386 is coupled to conduit 324.

Used fluid conduit 320 provide fluid communication between port 313 of valve 316, pressure differential switch 380, and port 396 of a flow direction control valve 312. Used fluid conduit 318 provides fluid communication between port 321 of valve assembly 316, port 395 of valve 312, and pressure differential switch 380.

As more fully described herein, the exchange pump 362 is interconnected to an accessed hydraulic fluid circuit (not shown) through a pair of female quick-connect fluid couplers 304, 306. This fluid circulation circuit to be serviced by the fluid exchange provided by the invention is opened and therefore split into an upstream communicating conduit opening and a downstream communicating conduit opening, each which are connected to one of a pair of fluid exchange hoses 300, 302 via female quick connects 304, 306. Suitable adapter mechanisms (not shown) may be utilized to facilitate the connection between quick connects 304, 306 and the accessed hydraulic circuit as known by those skilled in the art. These adapter mechanisms comprise an interface and allow female quick connects 304, 306 to be quickly and easily connected to the fluid circulation circuit so that it can be serviced with a fluid exchange provided by the invention. Hose 300 is connected to female quick connect 306 at one end and to a fluid conduit assembly 303 at its other end. Conduit assembly 303 provides fluid communication between conduit 303 and port 398 of valve 312. A flow switch 308 is interconnected to in parallel configuration with conduit 303.

Hose 302 is connected to a pressure switch 310 at one end and to female quick connect 304 at its other end. Pressure switch 310 is connected to fluid conduit 309 which is connected to a port 397 of valve 312. Pressure switch 310 is normally open and is set to activate at somewhat below the minimum pressure provided by the fluid circulation circuit being serviced, typically at 3–4 PSI for servicing the automatic transmissions of automobiles. For applications where higher pressure fluid circulation circuits are serviced, it may be necessary to provide a pressure relief mechanism to relieve excess pressure when the fluid exchange unit is inactivated and disconnected from the circuit being serviced (so that excessive pressure is not maintained in the system which could close pressure switch 310 before it properly indicates pressure from the fluid circulation circuit being serviced). Those skilled in the art may appreciate other suitable methods such a solenoid activated bleed off drain or equivalent or a small orifice leak down valve.

Flow switch 308 which is connected in parallel arrangement to conduit 303 indicates flow in one direction. Flow switch 308 is set to indicate fluid flow at somewhat below the minimum flow rate provided by the fluid circulation circuit being serviced as measured in parallel arrangement as illustrated. The parallel arrangement of flow switch 308 in conduit assembly 303 provides a splitting of the fluid flow and allows a smaller, less expensive switch to be used, one that can be activated at lower flows, typically 0.2 gallons per minute, for servicing the automatic transmissions of automobiles and higher for servicing the automatic transmissions of large commercial trucks. Other advantages of this parallel arrangement will become apparent as the invention is further described. Of course, one skilled in the art could substitute a second flow switch in place of pressure switch 310 and arrange it to indicate flow coming from the accessed fluid circulation circuit through hose 302. Alternatively a bi-directional flow indicator could be utilized. There are a number of such type indicators available, for example, a paddle wheel design which can spin and indicate in either direction would suffice.

A flow alignment mechanism is provided in this preferred embodiment. Valve 312 in arrangement with flow switch 308, pressure switch 310, and integrated circuit board assembly 358 and main wiring harness 356, provides automatic fluid flow alignment between the fluid exchanger and the direction of fluid flow in the fluid circulation circuit being accessed. This is but one type of flow alignment mechanism that can be utilized.

Valve 312 is a three position dual solenoid operated valve with a spring return to center (the default mode) which establishes a bypass connection between a pair of fluid exchange hoses 300, 302. A bypass mode of operation is provided such that the accessed fluid circulation circuit to be serviced can be activated and operated with fluid flowing in through the circuit until such time the fluid exchange is initiated by the exchange device. This bypass is provided by the default position of valve 312 in conjunction with positively indicating flow switch 308 and positively indicating pressure switch 310, and integrated circuit board controller assembly 358. Control valve 312 is activated by the controller device 358 (in response to pressure switch 310 and flow switch 308 signals) to align the flow of fluid within the accessed fluid circulation circuit with proper flow of fluid within the exchange device. As illustrated in FIG. 15, with used fluid being introduced through conduit 300, the valve 312 permits the used fluid to flow through conduit 320. Alternatively, if the used fluid was introduced in conduit 302 (not shown), the valve 312 would transition to permit the used flow to flow through conduit 320.

Fresh fluid supply tank assembly 346 is comprised of a tank 347 which has a filler neck 352 and a vented cap 354. Tank 347 is designed to hold and dispense fresh fluid 348. A float switch 350 is mounted to and through the side wall of tank 348 which is suitably sealed to prevent leakage and is activated by a drop in fresh fluid level below the indicating level of float switch 350. Float switch 350 is normally closed when an adequate supply of fresh fluid 348 is present in tank 347. Float switch 350 is connected to integrated circuit board assembly 358 by main wiring harness 356. If the level of fresh fluid 348 drops lower than the indicating level of float switch 350, the circuit between float switch 350 and circuit board assembly 358 is turned off which causes valve 312 to be de-energized, placing it in its middle, spring returned bypass position, thus removing pump 362 from connection to the accessed fluid circulation circuit. The fluid exchange can only occur if float switch 350 is in its on position indicating an adequate supply of fresh fluid 348. Tank 347 has a drain conduit 345 connected to it, with a drain valve 344 connected to it. Tank 347 has conduit 347 connected to its lower wall. Conduit 374 is connected to pump mechanism 342.

Integrated circuit board controller assembly 358 is connected via wiring harness 359 to an electric power supply assembly 360. While one preferred embodiment of a controller is described herein, it is readily appreciated by those skilled in the relevant arts that alternative controller devices may be used to received signal inputs and provide signal outputs to control various components of the exchange device. Circuit board controller assembly 358 is connected to electrical components switches 350,310, 380, 308, sensors 326, 330, pump 342, and valves 312, 314, 316 by wiring harness 356. Circuit board assembly 358 has an integral microprocessor with suitable software commands held in memory, and has a number of switching devices to provide electrical power provided by power supply 360 to valves 314, 316, 312 and to pump 342 in response to electrical signals provided by flow switch 308, pressure switch 310, pressure differential switch 380 position sensors 326, 330 and float switch 350. Electrical current provided to pump 342 is variably provided depending on the processing of input signals on integrated circuit board assembly 358 and its processed output. A control panel assembly 363 is connected to integrated circuit board assembly 358 by wiring harness assembly 361. Control panel assembly 363 is comprised of a lighted on-off switch, an intermittent push button for starting the fluid exchange, and a push button for stopping the fluid exchange. Power supply assembly 360 can be constructed to provide either 115 or 230 volts alternating current, 12 or 24 volts direct current from a vehicle's battery or supplementary battery or 12 or 24 volts direct current stepped down from 115 or 230 volts alternating current by an integral transformer. In this case power supply 360 provides 12 volts direct current stepped down from 115 volts alternating current.

Main wiring harness 358, voltage regulator assembly 360 and control panel 363 each has an integrated male connector at its integrated circuit assembly 466 end, which is suitable for plugging into a compatible integrated female connector provided at integrated circuit board assembly 358 (not shown). The connections between switches 350, 310, 380, 308, sensors 326, 330, pump 342, and valves 312, 314, 316 and wiring harness 356 are not shown but many types of suitable and appropriate connectors are known to those skilled in the art.

A separate selectively activatable fluid communication may be provided by a valve 341 and associated conduits between fluid conduit 340 and fluid conduit 318. Valve 341 may be controlled via controller device 358 to permit fresh fluid from the fresh fluid source 347 to be introduced into the accessed fluid circulation circuit, as during a filling process. For example, before, during or after the exchange procedure, a quantity of fresh fluid may be injected into the accessed hydraulic circuit.

It may be appreciated that a variety of sensor mechanisms may be utilized to attain the desired switching of fluid distribution control valves 314, 316. Activation of a single solenoid or pair of solenoids to switch positions of a used and/or fresh fluid control valve or pair of such, can be accomplished by using proximity sensors comprised of a magnetically activated reed switch or other type of magnetically activated sensor with the magnet mounted at the end center of the reciprocating member. Alternatively, a position sensor and its activating magnet can be mounted in other positions and still provide the necessary valve switching functions, for example at the edge of a piston or along a connecting rod if a dual linked piston reciprocating pump fluid exchanger is being used. In addition, there are a number of other types of position sensors mechanisms that can be used such as inductive, capacitor disruptive, optical or laser reflective.

As an alternative to using a position sensor mechanism to trigger a solenoid to switch a fluid distribution valve 314, 316 position, a properly arranged flow switch or switches (not shown) can be suitable arranged to communicate with one or more conduits depending on the number of cylinders, whether or not they are linked or unlinked, and whether or not pressurized fresh fluid as a supply source is used in lieu of a gravity feed supply source. Of course these flow switches may be uni-directional or bi-directional and arranged in series or parallel, depending on the switching function which need to be provided. Flow switches can be used to determine piston position as flow rates are terminated in associated conduits upon the piston reaching the extent of its range of motion. Alternatively, as a piston reaches it end of stroke position, the fluid entering the chamber on the opposite side of a piston will slow and then stop flowing, thereby also providing a way to generate a signal by using a flow sensor that is constructed to open or close when flow stops. Alternatively, a magnetic trigger or other type of trigger could be mounted or affixed to the connecting rod of a dual linked piston reciprocating pump based fluid exchanger to provide a signal to energize the solenoid of used and/or fresh fluid control valves.

Compressed air or fluid signals could be used for such valve control purposes as provided by specially constructed pilot valves, with such signals being used to signal and/or power used and/or fresh fluid control valves to switch when a reciprocating based pump fluid exchanger reaches the end of its cycle. In addition there are a number of other methods available to sense the slowing or stopping of fluid flow and the position of a reciprocating element whether it be a piston, diaphragm or other, some of which include but are not limited to laser signals paired with laser sensing receivers, rotor or piston based flow switches, some of which are base on the Hall effect, but there are a number of others known to those skilled in the art of flow switches and position sensor mechanisms. The use of specialized flow sensors provides flexibility of positioning the sensor at various positions along the conduits, valves or ports which communicate with the chambers. In many cases, specialized flow or position sensors require specialized electronic sending and/or receiving units which can make them more costly.

The operation of the fluid exchange embodiment of FIG. 15 will now be described. The closed fluid circulation system of an automatic transmission or other hydraulic fluid circuit is accessed (not shown) to establish fluid interconnection of the exchange device such that used fluid can be received from the fluid circuit and fresh fluid can be simultaneously introduced into the fluid circuit by the exchange device. Typically, the fluid circulation circuit is opened and therefore split into an upstream communicating conduit opening and a downstream communicating conduit opening. Exchange hoses 300, 302 may be randomly coupled to the accessed openings of the fluid circulation circuit. Connections between the opened circuit and hoses 300, 302 are provided by connecting one with each of a pair of suitable adapter mechanisms by using female quick connects 304, 306. Since the invention has a flow alignment mechanism, the operator does not need to know the direction of fluid flow in the accessed fluid circulation circuit or which of the pair of hoses 300, 302 is connected to communicate with any specific port of valve 312.

After the exchange device is coupled into the fluid circulation circuit being serviced, the circuit is energized to receive flow fluid. The fluid circulation circuit to which the exchange device is connected may be the cooling circuit of an automatic transmission of a vehicle. As soon as the connections are secure, the operator starts the vehicle's engine to energize the internal pump of the transmission to circulate fluid through the transmission's cooling circuit. For sake of example, FIG. 15 illustrates one of two possible connection interface configurations between hoses 300, 302 and the direction of fluid flow in the accessed fluid circulation circuit.

Prior to fluid flow into the exchange pump 362, fluid alignment may be achieved via operation of valve 312. To accomplish flow alignment, valve 312 is directed to its middle bypass position. Controller 358 receives signals from both fluid flow switch 308 and fluid pressure switch 310. If fluid flow switch 308 is activated (fluid is flowing in through one way flow switch 308) and if a pressure signal is received from switch 310, the controller will transition the valve 312 to a position as illustrated in FIG. 15, i.e., fluid communication is provided between two pairs of ports 397/395 and 398/396. Alternatively, if fluid flow switch 308 is not activated (flow is flowing against the one way switch 308), the controller will transition the valve 312 to its position opposite that of FIG. 15, i.e., fluid communication is provided between two pairs of ports 397/396 and 398/395. The indicating signals provided to flow switch 308 and pressure switch 310 are communicated to integrated circuit board assembly 358 by main wiring harness 356. The microprocessor (not shown) on the integrated circuit board 358 then processes the signals based on the software instructions in its integrated memory producing a command signal sent to valve 312 by main wiring harness 356 to energize the position solenoid accordingly. In this way, proper fluid flow alignment is automatically established by the invention. If the fluid circulation circuit loses pressure and its circulation of fluid stops, or power is cut off from the fluid exchanger for any reason, valve 312 returns automatically to its spring fed center bypass position.

Upon valve 312 being activated in proper position to establish alignment between the direction of fluid flow in the accessed fluid circulation circuit, used fluid flows into conduit assembly 320 from port 396. Simultaneous with this, integrated circuit board assembly 358 energizes pump assembly 342 to draw and pressurize fresh fluid 348 from tank 347.

As illustrated in FIG. 15, pressurized fresh fluid is introduced into inner chamber 379. Inner chamber 379 and outer chamber 382 (having pressurized used fluid from the accessed circulation circuit) bias the piston assembly 378/387/390 to the left. This piston assembly 378/387/390 movement causes outer chamber 377 to discharge its captive used fluid out through port 332, into and through used fluid conduit 322, into port 315 and out of port 311 of valve 314, and into and through used fluid discharge conduit 386 to be deposited in used fluid receiver 383. The positive pressure provided by pump assembly 342 augments the force of used fluid pressure providing the movement of piston/rod/piston assembly 378/387/390. Integrated circuit board assembly 358 operates to increase pump 342 pressure boost pressure differential switch 380 indicates approximately negligible pressure differential between conduit assemblies 320, 318. As a consequence, boost pump 342 minimizes or eliminates any resistance which would otherwise be provided to the fluid flow in the fluid circulation circuit being accessed.

Upon the pressure of used fluid conduit assembly 318 approximately matches the pressure of fresh fluid conduit assembly 320, pump assembly 342 may be maintained at that output by integrated circuit board assembly 358. Integrated circuit board assembly 358 has a series of stepwise electronically controlled electric resistance switches (not shown) which are instructed to de-activate in timed increments until the pressure differential switch 380 indicates approximately no pressure difference. If for any reason the pressure of fresh conduit assembly 318 rises significantly higher than used fluid conduit assembly 320, integrated circuit board assembly 358 progressively activates these electronically controlled electric resistance switches, thereby reducing current to pump assembly 342 to reduce pump 342 output until the pressure differential switch 380 stops indicating a higher pressure in conduit 318 as compared to conduit 320.

Simultaneously with the piston assembly 378/387/390 being biased to the left, fresh fluid from inner chamber 381 is being forced out and through valves 316 and 312 and introduced into the accessed fluid circuit through conduit 302. Upon the piston assembly 378/387/390 fully transitioning to the left, valves 314, 316 are operated in duplicate fashion, synchronized by integrated circuit board assembly 358 to reverse the movement of the piston assembly 378/387/390. As piston/rod/piston assembly 378/387/390 reaches its end of stroke movement (as detected by sensor 330), its direction of movement is reversed by the substantially simultaneous shifting of valve 314, 316 to alternate positions. With the piston moving in the opposite direction as indicated in FIG. 15 (not shown), fresh fluid is introduced into inner chamber 381 from pump 342, fresh fluid in being expelled from inner chamber 379, used fluid is being introduced into outer chamber 377, and used fluid is being expelled from outer chamber 382 to used fluid receptacle 384. Upon the piston assembly reaching its end of stroke movement (as detected by sensor 326), it direction of movement is again reversed by simultaneous shifting of valves 314, 216 to alternate positions. This simultaneously results in piston/rod/piston assembly 376/387/378 reversing its direction of movement and moving as depicted in FIG. 15.

Discharge conduit 322 can be constructed of a clear type plastic or may alternately have a clear sight glass installed, allowing the operator to view the clarity of the used fluid being extracted from the accessed fluid circulation circuit. Alternatively, an electronic resistance or optically based fluid clarity sensor can be installed in used fluid discharge conduit 322 and wired into properly adapted main wiring harness 356 and integrated circuit board assembly 358, and this sensor can then be used to trigger an automatic cessation of the fluid exchange when a certain desired used fluid clarity is attained. Or a fluid sight glass or clarity sensor can be installed on used fluid conduit assembly 320 at the port 396 or 313 end. The use of a fluid sight glass on the used fluid line alone or in conjunction with an additional one installed on fresh fluid conduit assembly 318, can provide used fluid clarity information to the operator so as to visually indicate completion of the exchange process, i.e. comparison between the used and fresh fluid. Alternatively the exchange device can be automatically terminated upon emptying of the fill fresh fluid tank 448 with a selected volume of fresh fluid.

Figure 16:
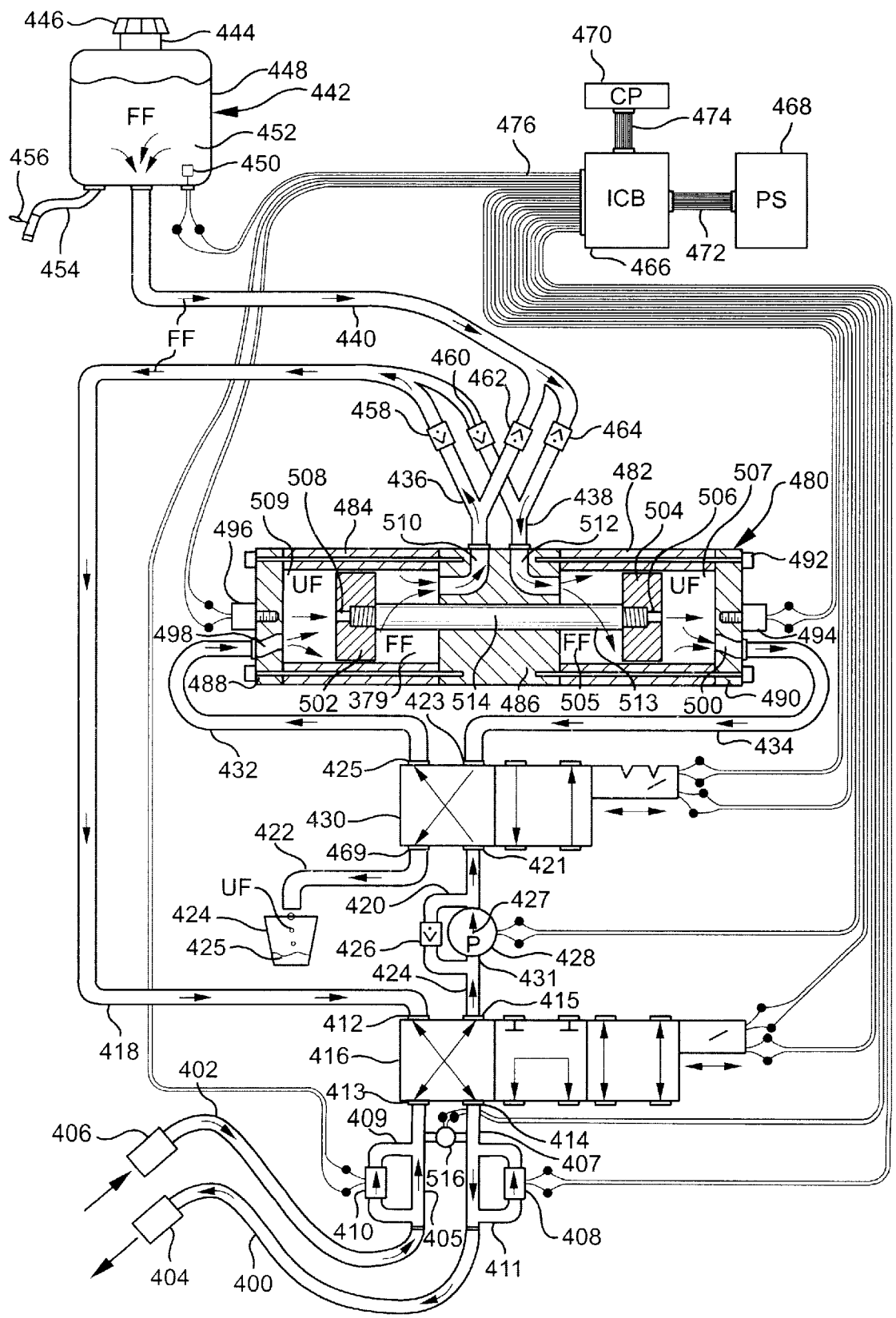
FIG. 16 is a schematic illustration of another embodiment of a fluid exchange system according to the present invention.

FIG. 16 illustrates another preferred embodiment of the present invention. As shown in FIG. 16, a novel fluid exchange device includes a reciprocating pump 480, having associated valves 416 and 430 being operatively controlled via controller 466 to directed use and fresh fluid to and from the exchange pump 480 during an exchange procedure. Flow alignment may be achieved via operation of control valve 416. As further described herein, a used fluid boost pump 428 is provided to facilitate the exchange procedure.

The exchange pump 480 includes a pair of cylinders 482, 484 a pair of rigid heads 488, 490 secured to the cylinders 482, 484. A cylinder block 486 provides a body for securing the cylinders 482, 484 together. Threaded fasteners, such as a bolt 492, are inserted through correspondingly arranged holes in cylinders 482, 484 and cylinder heads, 488/490. Exchange pump 480 has a pair two interiorly-received fluid separation structures, in this embodiment being a pair of pistons 502, 504 which are rigidly linked by a connecting rod 513. Rod 513 has threaded ends which are secured into receiving holes in pistons 502, 504 (holes not shown). Bore hole 514 is provided in such manner for a relatively close fit and acceptable seal in combination with rod 513, without causing too much drag such as to impede operation of pump 480. Of course, a wide assortment of many acceptable types of seals and sealing systems can be selected by those skilled in the art which are resistant to hydraulic fluids which can provide tighter sealing. Piston 502 has a magnet 508 pressed into a properly sized center drilled hole (not shown) and piston 504 has a magnet 506 pressed into a properly sized center drilled hole (not shown). Head 488 has a position sensor 496 installed and has a used fluid port 498 which connects to a working chamber 509. Head 490 has a position sensor 494 installed and has a used fluid port 500 which connects to a working chamber 507.

Cylinders 482, 484, heads 488, 490, block 486, pistons 502, 504, and connecting rod 513 are constructed of aluminum alloy for its strength, ease of machining and/or casting and magnetic neutrality, assuring good function of the magnetically operated position sensors. Many other suitable materials are available to be selected by one skilled in the art such as suitably pressure and fluid resistant plastics. Steel could be used as long as the position sensors and magnetic triggers are somewhat isolated from the steel by used of magnetically neutral inserts around such items. Sealing used for cylinder to head and cylinder to block sealing is the use of large O-rings in cylindrically machined grooves (not shown). Other types of suitable sealing such as hydraulic fluid resistant rtv type sealer or gasketing can be selected by one skilled in the art.

Exchange pump 480 has a pair of fresh fluid ports 510, 512 which connect to a pair of inner variable volume fluid chambers 503, 505 respectively. The exchange pump also defines a pair of outer chambers 507, 509 disposed away from the inner chambers 503, 507 and separated by separation structures, i.e. pistons 502, 504. The outer chambers 507, 509 alternatively receive pressurized used fluid from valve 430 and alternatively discharge used fluid to a used fluid receiver 424. Inner chambers 503, 507 alternatively draw fresh fluid 452 from a fresh fluid supply tank assembly 442 through a fresh fluid conduit 440 and alternatively discharge fresh fluid to enter the accessed fluid circulation circuit being serviced (not shown, e.g., transmission cooling circuit). With the piston assembly moving from right to left and valve 430 aligned as illustrated in FIG. 16, inner chamber 503 forces fresh fluid through check valve 462 and through conduits 418 and 400 to be introduced into the accessed hydraulic circuit. Simultaneously, inner chamber 505 draws fresh fluid from fresh fluid conduit 440 through a check valve 464 and fresh fluid port 512.

Used and fresh fluid flows relative to pump 480 are controlled by a single actuated flow direction control valve assembly 430 which is a two position, four-way dual electric solenoid operated spool valve with detent. Valve 430, when unpowered, will stay in the previously activated position due to its detent. Of course, there are many other automatically actuated valves or valve combinations which could be selected and arranged to have similar, suitable, and equivalent functions for practicing this and alternative embodiment of the present invention, such as compressed air or gas, or hydraulic fluid operated valves, or many possible combinations and/or other types of electrically actuated valves, with such valves arranged multiply in a conduit system or as a part of a manifold system.

In operation, the volumes of each of the chambers 503, 505, 507, 509 are variable and determined by the relative position of the dual piston/rod assembly 502/513/504 within the dual cylinder assembly 488/484/486/482/490. Minimal fluid is lost across the sealing surface at the interface between the cylinders 482, 484 and pistons 502, 504. Of course, a variety of seals and sealing systems on the outside circumference of pistons 502, 504 may be selected by those skilled in the art. In this embodiment, the outer chambers 507, 509 are coaxial with the inner chambers 503, 505. It should be appreciated that the outer chambers 507, 509 and inner chambers 503, 505 are of a cylindrical shape in this preferred embodiment, however, other configurations are possible. Additionally, the dual fluid separation structure of pistons 502, 504 could be diaphragm assemblies of other structures disclosed hereinafter. The diaphragms may be made of a flexible material such as a rubber-like or other conventional material that is resistant to hydraulic fluid of the particular fluid being serviced. The flow rates and volumes of the used and fresh fluids passing through pump 480 are substantially the equivalent during the exchange process.

A fresh fluid conduit assembly 436 is connected to fresh fluid port 510 of block 486 and is connected to a pair of check valves 458, 462 which in turn are connected to a pair of fresh fluid conduits 418, 440. Fresh fluid conduit 418 provides fluid communication between check valves 460, 462 and used fluid distribution valve 416. A fresh fluid conduit assembly 438 is connected to fresh fluid port 512 of block 486 and is connected to a pair of check valves 460, 464 which in turn are connected to a pair of fresh fluid conduits 418, 440. Fresh fluid conduit 440 provides fluid communication between check valves 462, 464, and fresh fluid supply tank assembly 442.

Valve 416 is a three position four-way dual solenoid operated valve with spring return to its middle default position which provides a fluid bypass between a pair of its ports 413, 414. Fresh fluid conduits 436, 438 and check valves 458, 460, 462, 464 are arranged in such a manner that ports 510, 512 alternatively receive distributed fresh fluid from conduit assembly 440 and alternatively deliver fresh fluid to fresh fluid conduit 418, therefore not requiring the use of a fluid distribution valve, such as the two position four-way valve 430 used to direct the flow of used fluid to the outer chambers 507, 509.

A used fluid control valve assembly 430 is provided to control the flow of used fluid flow to exchange pump 480. Valve 430 is a two position four-way solenoid operated with detent. A used fluid conduit 432 fluidly connects a valve port 425 of valve 430 to port 498 of pump 480. A used fluid conduit 434 connects a valve port 423 of valve 430 to port 500 of pump 480. Valve 430 is plumbed to alternatively distribute used fluid from the accessed fluid circulation circuit to ports 498, 500 through conduits 432, 434, as directed by an integrated circuit board assembly 466 which is connected electrically to the electric solenoid of valve 430 (not shown) by a main wiring harness 466.

A used fluid discharge conduit 422 is connected at port 469 of valve 430 to discharge a used fluid 425 into a used fluid receiver 424 (as received from conduits 432, 434 under control of valve 430).

A used fluid conduit assembly 429 provides fluid communication between port 415 of valve 416, check valve 426, and inlet port 431 of a variable speed vane pump 428. A used fluid conduit 420 provides fluid communication between port 421 of valve 430, outlet port 427 of pump 428, and check valve 426.

Pump 428 is a variable speed 12 volt DC powered centrifugal pump. The outlet pressure of pump 428 can be controlled by the increase or decrease of current as controlled by an integrated circuit board assembly 466 through a main wiring harness 476, in response to signals received from a pressure differential switch 516 which is arranged intermediate to a pair of fluid conduits 405, 407. Pressure differential switch 516 is a dual indicating switch, indicating which conduit 405, 407 is at higher pressure. The switch selected for use senses an approximately 5 psi (pounds per square inch) difference, but higher pressure applications may require a greater pressure difference. Integrated circuit board controller 466 contains a microprocessor system controlled by software fixed in to memory circuits with various electronically controlled electric switching devices, a progressive step wise electronic rheostat control mechanism for pump 428 and circuits to receive electronic signal inputs and to make electric and electronic outputs. Integrated circuit board controller 466 has suitable memory in combination with a microprocessor to process input signals from pressure differential switch 516 in coordination with input which determines the actual direction of fluid flows through conduits 405, 407, and is therefore able to control pump 428 in relation to boosting or decreasing its output relative to the actual directions of fluid flow through conduits 405, 407. Of course many other pump types and configurations can be used to provide variable output such as using a constant current electrically powered vane pump or gerotor gear pump perhaps with an electronically controlled variable resistance bypass circuit. Thus, pump 428 can be operated and controlled to provide enough pressure to approximately cancel out any the pressure drop in the accessed fluid circulation circuit which might otherwise result from the application of the fluid exchanger. This, in effect can remove the resistance of the fluid exchanger and allow the accessed fluid circulation circuits fluid to be exchanged without significantly affecting the flow rate of that accessed fluid circulation circuit. This is an important consideration when accessing and exchanging the fluid of low flow fluid circulation circuits, especially when exchanging the fluid of small and/or low flow automatic transmissions such as found in Toyotas, Geo Metros, for example. Some of these low flow transmissions may not generate enough pressure to operate the fluid exchanger unless some sort of additional means is used to augment the powering of pump 513.

As more fully described herein, pump 480 is interconnected to an accessed hydraulic fluid circuit to be serviced by providing a fluid exchange with the invention through a pair of female quick-connect fluid couplers 404, 406. This fluid circulation circuit (not shown) is opened and therefore split into an upstream communicating conduit opening, and a downstream communicating conduit opening, each of which is connected to one of a pair of fluid exchange hoses 400, 402 via female quick connects 406, 404. Suitable adapter mechanisms (not shown) may also be used.

These adapter mechanisms comprise an interface and allow female quick connects 404, 406 to be connected access the fluid circulation circuit being serviced. Hose 400 is connected then to female quick connect 404 at one end and to a fluid conduit assembly 411 at its other end. Conduit assembly 411 is then connected to conduit 407 which is coupled to pressure differential switch 516 and also connected to port 414 of valve 416. Conduit 407 has a flow switch 408 interconnected in parallel configuration.

Hose 402 is connected to a female quick connect 406 at one end and to a fluid conduit assembly 409 at its other end. Conduit assembly 409 is connected to conduit 405 which is coupled to the pressure differential switch 516 and which is also connected to port 413 of valve 416. Conduit 409 has a flow switch 410 interconnected in parallel configuration. Flow switches 408, 410 are normally open and are set to activate at slightly below the minimum pressure provided by the fluid circulation circuit being serviced, typically at 4 psi for servicing the automatic transmissions of automobiles.

For applications where higher pressure fluid circulation circuits are serviced, it may be necessary to provide a pressure relief mechanism to dissipate excess pressure when the fluid exchange unit is inactivated and disconnected from the circuit being serviced so that excessive pressure is not maintained in the system. Those skilled in the art can select one of many suitable methods such a solenoid activated bleed off drain mechanism or small orifice pressure bleed down valves or equivalent if required in higher pressure applications.

Flow switches 408, 410 are connected in parallel arrangement to conduits 409, 411 to indicate flow in one direction only. Flow switches 408, 410 are utilized to indicate fluid flow in one direction only, at somewhat below a minimum flow rate provided by the fluid circulation circuit being serviced. The parallel arrangement of flow switches 408, 410 in conduit assemblies 411, 409 provides a splitting of the fluid flow and allows smaller, less expensive switches to be used. Of course, one skilled in the art could substitute a bi-directional flow indicator in lieu of both flow switches 408, 410, and this bi-directional flow indicator could be installed on one of the conduit assemblies 409, 411 in parallel configuration or even series configuration. There are a number of such type bi-directional flow indicators available, for example, a paddle wheel design which can spin and indicate in either direction would suffice and some of this provide electronic signals which can be used to meter the total volume of fluid passing through the flow indicator, which allows the operator to record the volume of fresh fluid delivered if one of these such indicating bi-directional flow indicator meters in installed in series to meter all the fluid passing in or out of ports 413, 414 of valve 416.

In addition, a flow alignment mechanism is utilized. Valve 416 in arrangement with flow switches 408, 410, and integrated circuit board assembly 466 and main wiring harness 476, provide automatic fluid flow alignment between the fluid exchanger and the direction of fluid flow in the fluid circulation circuit being accessed. This is but one type of flow alignment mechanism that can be utilized.

Valve 416 provides spring return to a center unpowered default position which provides a connection circuit between conduit assemblies 409, 411, thus providing a bypass mode of operation for the fluid exchange invention such that the accessed fluid circulation circuit to be serviced can be activated and will continue to flow fluid through the circuit in normal fashion until which time the fluid exchange is initiated by the device. Valve 416, as commanded by controller 466 in response to flow switches 408, 410, aligns fluid flow in the accessed fluid circulation circuit with pump 480. Valve 416 can be shifted from its middle bypass position to its proper alignment position as determined by integrated circuit board assembly 466 in coordination with indicating signals received from flow switch 408 or 410 through main wiring harness 476. Integrated circuit board assembly 466 can be constructed and programmed to start the fluid exchange automatically when a flow switch signal is received from one of the flow switches 408 or 410 or can be constructed in coordination with a control panel 470 such that a start button is provided on control panel 470 to allow the operator to have the fluid circulation circuit flowing fluid for a while so that the sump of the transmission of device being serviced can be checked for proper operating level.

Fresh fluid supply tank assembly 442 is comprised of a tank 448 which has a filler neck 444 and a vented cap 446. Tank 442 is designed to hold and dispense a fresh fluid 452. A float switch 450 is mounted to and through the bottom wall of tank 448 which is suitably sealed to prevent leakage and is activated by a drop in fresh fluid level below the indicating level of float switch 450. Float switch 450 is normally closed when an ; adequate supply of fresh fluid 452 is present in tank 448. Float switch 450 is connected to integrated circuit board assembly 466 by main wiring harness 476. If the level of fresh fluid 452 drops lower than the indicating level of float switch 450, the circuit between float switch 450 and circuit board assembly 466 is turned off which causes valve 416 to be de-energized, placing it in its middle spring returned bypass position, a default position, thus removing pump 480 from connection to the accessed fluid circulation circuit. The fluid exchange can only occur if float switch 450 is in its on-position indicating an adequate supply of fresh fluid 452. Tank 448 has a drain conduit 454 connected to it, and conduit 454 has a drain valve 456 connected to it. Tank 448 has conduit 440 connected to its lower wall on one end and to check valves 462, 464 at its other ends.

Integrated circuit board assembly 466 is connected by a wiring harness 472 to an electrical power supply assembly 468. Circuit board assembly 466 is connected to electrical component switches 450, 408, 410, 516, sensors 494, 496, pump 428, and valves 416, 430, by wiring harness 476. Circuit board assembly 466 has an integral microprocessor with suitable software commands held in memory, and has a number of switching devices to provide electrical power provided by power supply 468 to valves 416, 430 and to pump 428 in response to electrical signals provided by flow switches 408, 410, pressure differential switch 516, position sensors 494, 496 and float switch 450. Electrical current provided to pump 428 is variably provided depending on the processing of input signals from the pressure differential switch 516 on integrated circuit board assembly 466 and its processed output to wiring harness 476. All of the electrical components of the invention except the valves have at least two wires, one a power wire and one a neutral wire (some or all may have an additional ground wire). The valves have at least four leads since each has two solenoids. Control panel assembly 470 is connected to integrated circuit board assembly 466 by wiring harness assembly 474. Control panel assembly 470 is comprised of a lighted on-off switch for turning the Unit on or off, an intermittent push button for starting the fluid exchange, and a push button for stopping the fluid exchange. Power supply assembly 468 can provide either 115 volts alternating current, 12 or 24 volt direct current from a vehicle's battery or supplementary battery, or 12 or 24 volt direct current transformed from 115 volts AC by an integral transformer. Of course the power supply 468 can be constructed to provide 12 or 24 volt direct current stepped down from 230 volts alternating current by a suitable transformer. Main wiring harness 476, voltage regulator assembly 468 and control panel 470 each has an integrated male connector at its integrated circuit assembly 466 end, which is suitable for plugging into a compatible integrated female connector at integrated circuit board assembly 470 (not shown). The connections which can be used between switches 450, 408, 410, 516, sensors 494, 496, pump 428, and valves 416, 430 and wiring harness 476 are not shown but are known to those skilled in the art.

The operation of the embodiment of FIG. 16 will now be described. The closed fluid circulation system of an automatic transmission or other hydraulic or fluid circulating circuit (not shown) can be accessed to provide fluid interconnection of the invention such that used fluid can be received from the fluid circuit and fresh fluid can be simultaneously introduced into the fluid circuit by the exchange device. Typically, the fluid circulation circuit is opened and therefore split into an upstream communicating conduit opening and a downstream communicating conduit opening, with a first chosen one randomly connected to one of a pair of fluid exchange hoses 400, 402 and the second remaining one is connected to the remaining hose of the pair of hoses 400, 402. Connections between the opened circuit and hoses 400, 402 are provided by connecting one with each of a pair of suitable adapter mechanisms (not shown). These suitable adapter mechanisms may terminate in male quick connectors (not shown) which allow quick and convenient connection to the female quick connects 404, 406. These adapter mechanisms comprise an interface to access the fluid circulation circuit being serviced. Since the exchange device utilizes a flow alignment mechanism, it is not required or necessary that the operator determine the direction of fluid flow in the accessed fluid circulation circuit or which of the pair of hoses 400, 402 is connected to communicate with any specific port of valve 416.

After the connections to access the fluid circulation circuit are made, the fluid circulation circuit is energized. The fluid circulation circuit may be the cooling circuit of an automatic transmission. As soon as the connections are secure, the operator starts the vehicle's engine to energize the internal pump of the transmission to circulate fluid through the transmission's cooling circuit. For sake of example, FIG. 16 illustrates one of two possible connection interface modes between hoses 400, 402 and the direction of fluid flow in the accessed fluid circulation circuit. In this particular instance used fluid from the accessed fluid circulation circuit flows through female quick connect 406, into and through hose 402, into and through conduit assembly 409 and flow switch 410, thereby activating flow switch 410 while allowing the majority of the fluid to flow through the central part of the conduit assembly 409. Valve 416 is provided into its middle bypass position (default mode) when the fluid exchanger is first connected and the transmission is activated. In the example of FIG. 16, hoses 400, 402 were connected in such fashion that valve 416 is activated by integrated circuit board assembly 466 into its left most or crossed-over position. In the example of FIG. 16, flow indicator 410 indicated flow. This alignment/start sequence may occur with a bypass mode of valve 416. In the bypass mode (valve 416 directed to its center bypass position), used fluid passing through conduit assembly 409 is directed through conduit 414 and into conduit 407. Flow switch 410 is activated by flow toward the valve 416 and pressure switch 408 is not activated by flow away from valve 416. While valve 416 is in its middle, default bypass position, ports 415, 417 are blocked. The indicating signal provided by flow switch 410 is communicated to integrated circuit board assembly 466 by main wiring harness 476. The controller (integrated circuit board 466) then processes signals based on the software instructions in its integrated memory and will produce a command signal to valve 416 by main wiring harness 476 to energize the solenoid placing the valve in the left shown position (the cross over position) when the operator presses the start button on control panel 470. This causes valve 416 to shift to a proper alignment position (in this case its left crossed over position) wherein the flow paths establish proper fluid flow alignment condition between the accessed circulation circuit and the fluid exchanger, thus establishing and maintaining a proper alignment condition between the direction of fluid flow in the fluid circuit being accessed and the fluid exchanger itself. Thus, when the fluid exchange is activated as shown in FIG. 16, used fluid flows into port 413, through valve 416 and out of port 415 to enter conduit assembly 429. If, for example the used fluid entered hose 400 through female quick connector 404, flow switch 408 would have been activated (and flow switch 410 would not have been activated), thus indicating flow in the opposite direction, a command signal will be generated to energize the solenoid placing valve 416 in its reversed position as shown. In this way proper fluid flow alignment is automatically established by the invention with no input by the operator. If the fluid circulation circuit loses pressure and its circulation of fluid stops, or power is cut off from the fluid exchanger for any reason, valve 416 returns automatically to its spring fed center, bypass mode position.

Upon valve 416 being activated in proper position to establish alignment between the direction of fluid flow in the accessed fluid circulation circuit, used fluid flows into and through conduit assembly 429 from port 415. Simultaneous to this, integrated circuit board assembly 466 energizes pump assembly 428 to boost or augment the used fluid flow from the accessed circulation circuit.

Pump assembly 428 is operated and the pressurized used fluid enters port 421 of valve 430, flows through valve 430 as shown and out of port 425 to flow into and through used fluid conduit 432 to enter port 498 of pump 480. This produces pressure in outer chamber 509 which biases the piston/rod/piston assembly 502/513/504 into movement toward the cylinder head 490. This causes outer chamber 507 to discharge its captive used fluid out through port 500, into and through used fluid conduit 434, into port 423 and out of port 469 of valve 430 and into and through used fluid discharge conduit 422 to be deposited in used fluid receiver 424, shown as used fluid 425 in the bottom of used fluid receiver 424.

During piston/rod/piston assembly 502/513/504 to the right as depicted in FIG. 16, valve 430 maintains a position as depicted. As piston/rod/piston assembly 502/513/504 moves to the right, fresh fluid 452 is drawn into inner chamber 505 from port 512, from fresh fluid conduit assembly 438, through check valve 464 and from fresh fluid conduit 440. Piston/rod assembly movement is achieved via fluid pressure generated by the pump of the accessed hydraulic circuit, e.g., an internal automatic transmission pump (not shown), and/or the pump assembly 428.

Integrated circuit board assembly 466, receives an input signal from pressure differential switch 516 and controls the output of pump 428 to provide approximately negligible pressure differential between conduit assemblies 418 and 420. If the used fluid flow rate is greater than the rate of flow that can be provided by pump 428, or if pump 428 fails for any reason, check valve 426 allows a bypass around pump 428.

The captive fresh fluid held in inner chamber 503 from its last refilling is simultaneously discharged into conduit 436 to flow through check valve 458 to flow into fresh fluid conduit 418 to enter port 417 of valve 416, through valve 416 and out of port 414, into and through conduit assembly 411 to flow through into and through hose 400 and female quick connect 404 to enter the fluid circulation circuit.

When piston/rod/piston assembly 502/513/504 moves (as depicted in FIG. 16) into its end of stroke position, the position sensor 494 will be activated by magnet 506, thus causing integrated circuit board assembly 466 to simultaneously shift valve 430 to its alternate detented position. This causes fluid flow reversal between ports 423, 425 of valve 430, thus causing piston/rod/piston assembly 502/513/504 to reverse direction of movement. Upon piston/rod/piston assembly 502/513/504 movement in a reverse direction to that depicted in FIG. 16, outer chamber 509 discharges its captive used fluid contents out of port 498, into and through used fluid conduit 432, into and through ports 425, 469 of valve 430, and then into and through used fluid discharge conduit 422 to be deposited in used fluid receiver 425. Simultaneously, outer chamber 507 receives used fluid from used fluid conduit 434 from ports 423, 421 of valve 430, through used fluid conduit assembly 420, of pump 428 and used fluid conduit assembly 429, and from ports 415, 413 of valve 416, and from fluid conduit 405 and from fluid conduit assembly 409 as directed by hose 402 through female quick connect 406, thus originating in the fluid circulation circuit. This infusion of used fluid into outer chamber 507 provides the force to bias piston/rod/piston assembly 502/513/504 toward the left. This infusion of used fluid into outer chamber 507 and fresh fluid into inner chamber 503 occurs simultaneously with the left movement of piston/rod/piston assembly 502/513/504. At the same time, inner chamber 505 discharges its fresh fluid through port 512, into and through fresh fluid conduit 438, check valve 460, into fresh fluid conduit assembly 418, and then to and through ports 417, 414 of valve 416 to be delivered into and through conduit 407 and then into conduit assembly 411, to and through hose 400 and female quick connect 404 and then to the fluid circulation circuit being serviced.

When piston/rod/piston assembly 502/513/504 reaches the end of its stroke, magnet 508 triggers position sensor 496 and causes valve 430 to shift to its alternate detented position. This simultaneously results in piston/rod/piston assembly 502/513/504 reversing its direction of movement, and it now again moves to the right as is depicted in FIG. 16.

The direction of fluid flows into and out of valve 416 as illustrated in FIG. 16, requires integrated circuit board assembly 466 to have recorded in its memory which particular fluid conduit 405, 407 is the used fluid inlet line from the fluid circulation circuit being accessed. This allows integrated circuit board assembly 466 to interpret signals from pressure differential switch 516 in proper context relative to the actual direction of fluid flow in fluid conduits 405, 407 since pressure differential switch 516 is located on the accessed fluid circulation circuit side of valve 416. In this particular flow configuration, fluid conduit 405 has used fluid flowing into it and through it to pump 480 from the accessed fluid circulation circuit and fluid conduit 407 has fresh fluid 452 from tank 448 through pump 489 flowing into it and through it to be delivered to the accessed fluid circulation circuit. Therefore, when integrated circuit board assembly 466 receives a signal from pressure differential switch that one of fluid conduits 405, 407 has significantly higher flow (based upon the pressure difference activation setting of pressure differential switch 516), it send the appropriate command signal(s) to pump 428 resulting in an increase or decrease of pump work until pressure differential switch 516 ceases indication of a significant pressure difference between conduits 405, 407.

Discharge conduit 422 can be constructed of a clear type plastic or may alternately have a clear sight glass installed, allowing the operator to view the clarity of the used fluid being extracted from the accessed fluid circulation circuit. Alternatively, a fluid clarity sensor can be installed in used fluid discharge conduit 422 to provide information to the operator when to discontinue the fluid exchanger by pressing a control button on control panel 470 which will stop the fluid exchange by shifting valve 416 to bypass. Alternatively the operator can fill fresh fluid tank 448 with a selected volume of fresh fluid which is expected to allow a very thorough fluid exchange, for exchanging most of the fluid contained in an automatic transmission, with the exception of a small percentage trapped in servos and valve bodies, some of which cannot be reached without extended operation or disassembly.

Figure 17:
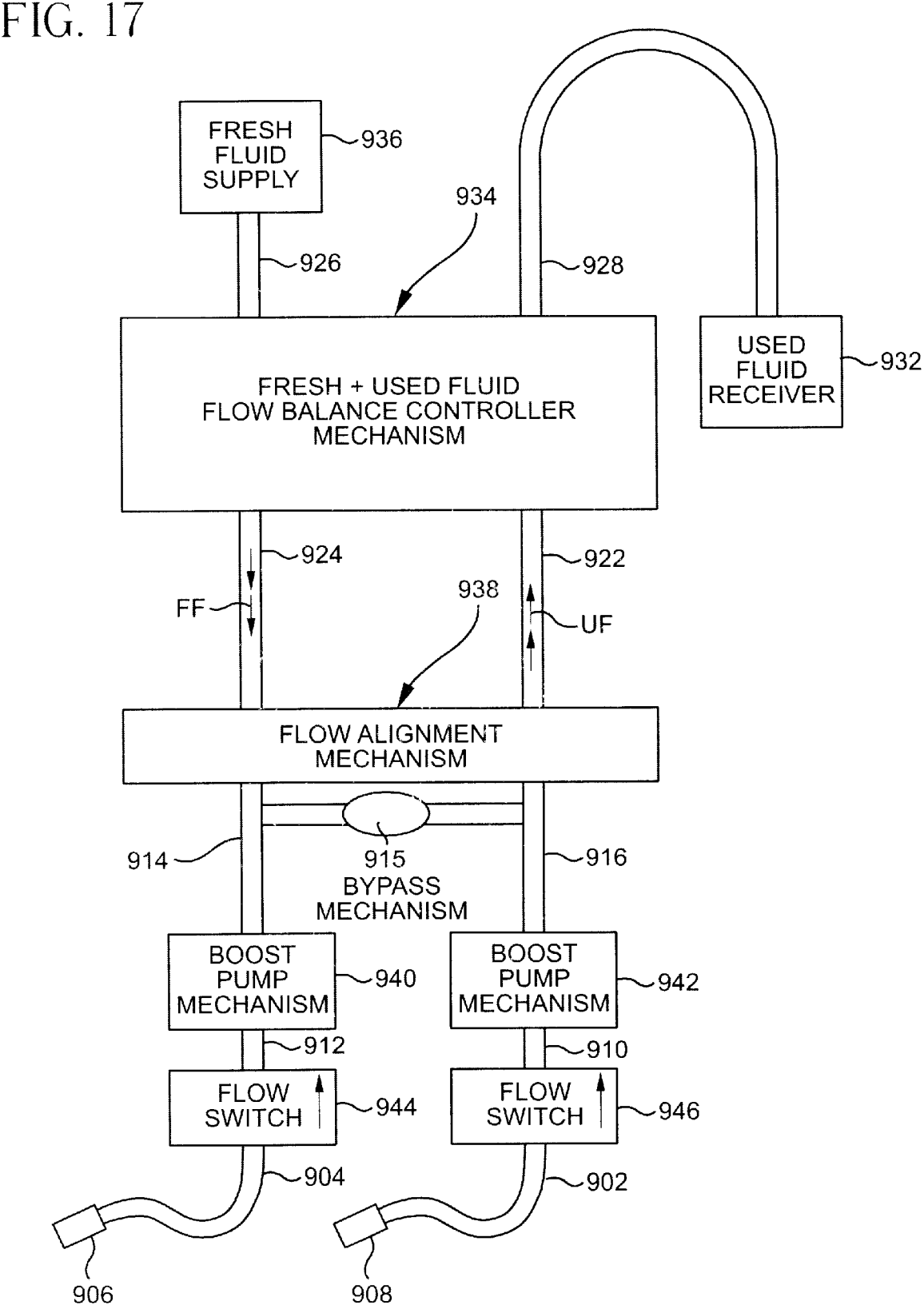
FIG. 17 is a schematic illustration of another embodiment of a fluid exchange system according to the present invention.

Another embodiment of the invention is illustrated in FIG. 17, and results from the modification of the embodiment illustrated in FIG. 16. FIG. 17 illustrates this additional embodiment in schematic form. An exchange device according to this embodiment of the present invention includes a flow balancing mechanism 934, a supply of fresh fluid 936, a flow alignment mechanism 938, and a pair of boost pump mechanisms 940, 942 for augmenting the flow of fluid within the exchange device.

An unpressurized and vented fresh fluid supply assembly 936 is provided and connected to a fresh fluid supply conduit 926 which is connected to a fresh and used fluid flow balance controller mechanism 934, which in this particular embodiment, as illustrated in FIG. 16, comprise a reciprocating pump assembly 480 in conjunction with used fluid distribution valve 430 and fresh fluid conduits 436, 438, 418, 440 with their check valves 458, 460, 462, 464.

A used fluid discharge conduit 928 is connected to provide fluid communication between the fluid flow balance mechanism 934 and used fluid receiver 932. A fresh fluid conduit 924 and a used fluid conduit 922 provide fluid communication between a flow alignment mechanism 938 and the flow balance mechanism 934. Bi-directional conduits 914, 916 provide fluid communication between the flow alignment mechanism 938 and a pair of boost pump mechanisms 940, 942, with one each arranged to intersect conduits 914, 916 and additional bi-directional conduits 912, 910. A pair of bi-directional fluid exchange hoses 904, 902 are provided with female quick connects 906, 908 installed at each end respectively. A pair of flow switches 944, 946 connect hoses 904, 902 to flow switches 944, 946. This particular embodiment provides for used fluid flow to be boosted, that is flow augmented, on the incoming used fluid side of hose/conduit pairs 904/912 or 902/910 when either associated of the pair of flow switches 944, 946 are activated. Of course inexpensive pressure switches can be substituted for flow switches to indicate direction of flow if the an integrated circuit board assembly is used which is designed and constructed to process the first pressure indicating signal to define that as the used fluid inlet or pressure side. This provides for the design and construction of a simpler, less costly fluid exchanger for servicing the automatic transmissions of automobiles and smaller vehicles.

A flow bypass mechanism 915 is coupled between the conduits 914, 916. The bypass mechanism 915 may be utilized to remove a portion of the exchange device from the accessed hydraulic circuit. For example, the bypass mechanism 915 may be activated to provided fluid bypass during a flow alignment procedure, or upon completion of a fluid exchange procedure.

A flow alignment mechanism can be utilized which has a bypass capability, and one might choose to use a solenoid operated three way valve between any pair of conduits (except 926, 928) to provide bypass between hoses 904, 902 and this can be activated automatically by a float switch in the fresh fluid supply. The boost pumps could be constructed to have paddle wheel impellers somewhat loosely fitting in a pump body, impellers that will turn to pump in a boosting fashion in one direction, but are designed and constructed to free wheel in the opposite bypass direction, thus allowing fluid to flow through them when they are not activated. This is less costly than using valve operated bypass circuits which would have to be differentially activated, but this method could be used also.

Figure 18:
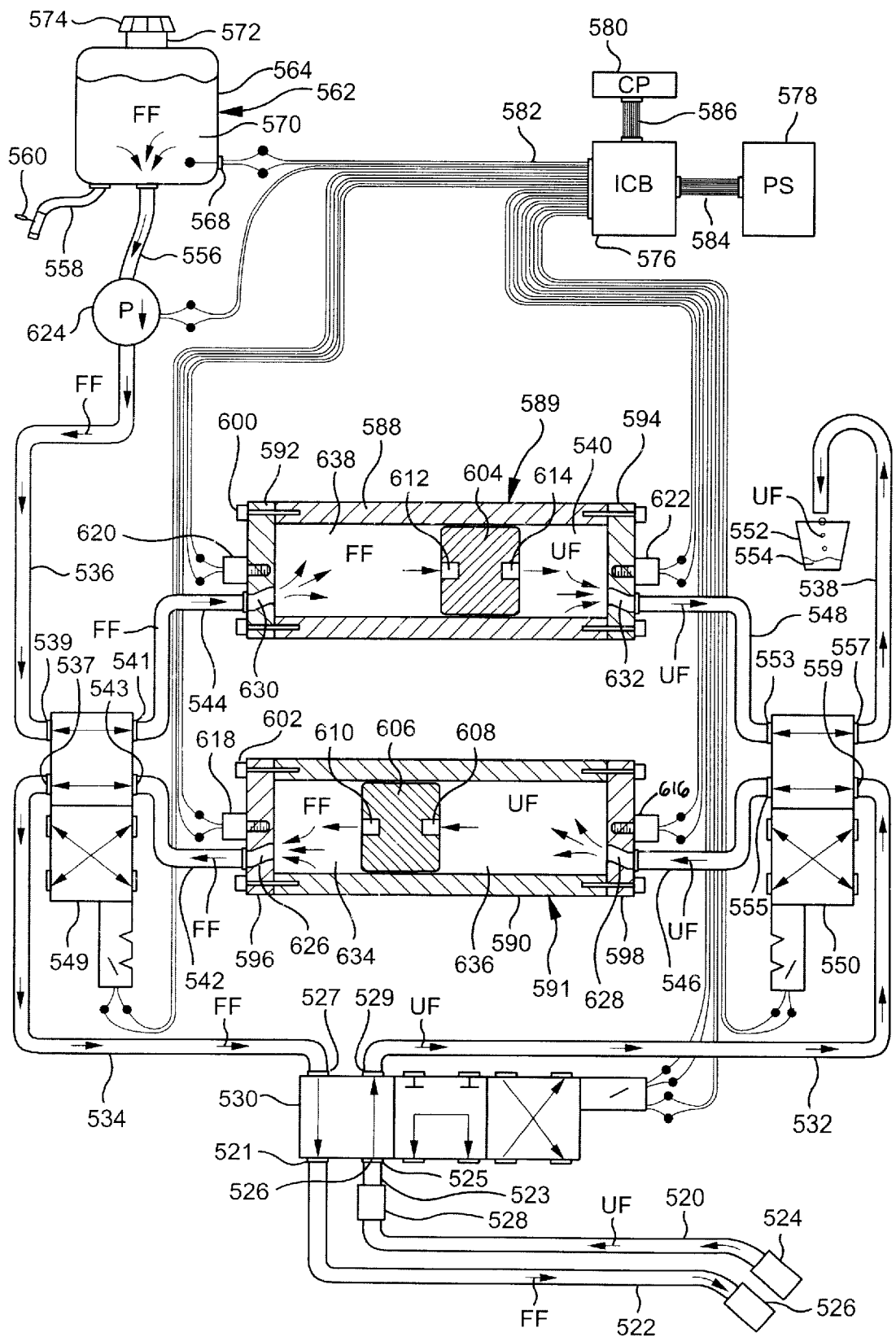
FIG. 18 is a schematic illustration of another embodiment of a fluid exchange system according to the present invention.

FIG. 18 illustrates another embodiment of a reciprocating, auto-loading fluid exchanger which provides balanced control of fresh and used fluid flows. This embodiment features a pair of free floating reciprocating pistons 604, 606 which are coordinated in function by an integrated circuit board assembly 576 instead of via a connecting rod as utilized in the embodiments of FIGS. 15 and 16. Fluid flow within the exchange device is controlled via valves 549, 550 operated in tandem manner via controller 576.

Two generally identical reciprocating pump assemblies are provided, upper pump assembly 589 and lower pump assembly 591. Pump 589 includes a smooth bore cylinder 588 with heads 592, 594 suitably attached by means of four bolts similar to bolt 600 which are inserted in appropriately arranged holes in heads 592, 594 and secured into cylinder 588. In this case a cylindrically placed large o-ring is used between heads 592, 594 and cylinder 588 and placed in properly machined cylindrical grooves cut into the ends of cylinder 588. Heads 592, 594 have position sensors 620, 622 screwed into properly tapped holes and also have ports 630, 632 provided. Port 630 is a fresh fluid port and port 632 is a used fluid port. Piston 604 is properly constructed to have a smooth outer circumference for close but not overly restrictive contact with cylinder 588, thus providing a fairly effective seal without the use of other methods of sealing know by those skilled in the art. Piston 604 has two magnets 612, 614 pressed into center machined holes on either side. Pump 589 thus is provided with a chamber 638 and a chamber 640, each separated from the other by fluid separation member piston 604. Of course, a number of other types of fluid separation members could be used such as a diaphragm type separation member, utilizing a thinner and smaller diameter magnetically neutral attached piston which can be constructed to hold a magnet for triggering a position sensor (one piece or two with the diaphragm sandwiched in between) with the diaphragm providing an effective seal and very low resistance to movement in the cylinder.

Pump 591 is comprised of a smooth bore cylinder 590 with heads 596, 598 suitably attached by means of four bolts similar to bolt 602 which are inserted in appropriately arranged holes in heads 596, 598 and secured into cylinder 590. In this case a cylindrically placed large o-ring is used between heads 596, 598 and cylinder 590 and placed in properly machined cylindrical grooves cut into the ends of cylinder 590. Heads 596, 598 have position sensors 618, 616 screwed into properly tapped holes and also have ports 626, 628 provided. Port 626 is a fresh fluid port and port 628 is a used fluid port. Piston 606 is properly constructed to have a smooth outer circumference for close but not overly restrictive contact with cylinder 590, thus providing a fairly effective seal without the use of other methods of sealing know by those skilled in the art. Piston 606 has two magnets 610, 608 pressed into center machined holes on either side. Pump 591 thus is provided with a fresh fluid chamber 634 and a used fluid chamber 636, each separated from the other by fluid separation member piston 608.

The embodiment of FIG. 18 has an integrated circuit board assembly 576 and a three position four-way dual solenoid powered flow direction control valve 530 with spring return to a middle default, bypass position as utilized in the preferred embodiments illustrated in FIGS. 15 and 16. The embodiment of FIG. 18 also includes two position four-way dual solenoid operated with detents fresh and used fluid distribution valves 549, 550 as utilized in the embodiment of FIG. 15.

Pistons 589, 606 are unlinked and are coordinated by the controller 576. Controller 576 receives input signals from position sensors 620, 622, 618, 616. Controller 576 controls the operation of fresh fluid delivery valve assembly 594, a used fluid delivery valve assembly 550, and a fresh fluid fill pump assembly 624. Fresh fluid pump 624 is a constant current, relatively high output gerotor pump assembly with a present relief valve bypass back to a fresh fluid supply tank assembly 562 (relief bypass not shown but understood by those skilled in the art). Pump 624 may have capacity and output to supply pumps 589, 591 relatively quickly as pistons 604, 606 are unlinked. This embodiment also includes a default design feature that if pump 589, 591 is not refilled by pump 624 prior to expulsion of fresh fluid by the other pump 589, 591, valve 530 is placed in bypass mode by integrated circuit board assembly 576 until the pump 589, 591 is completely refilled with fresh fluid.

Valve 549 is connected to pumps 589, 591 by a pair of fresh fluid conduits 544, 542 which are connected to ports 630, 626 at the pump end and ports 543, 541 at the valve end. Valve 550 is connected to pumps 589, 591 by a pair of used fluid conduits 548, 546 which are connected to ports 632, 628 at the pump end and ports 553, 555 at the valve end. A used fluid receiver 552 is provided to receive used fluid 554 extracted from the pressure side of the fluid circulation line being serviced (in this case the cooling line of an automatic transmission).

Used fluid discharge conduit 538 is arranged to discharge used fluid 554 into used fluid receiver 552 and is connected to port 557 to receive captive used fluid discharged from chambers 640, 636 of pumps 589, 591 as provided by valve 550. Conduit 538 can have a sightglass or be constructed of somewhat clear braided plastic hose, either of which will allow the operator to evaluate the clarity of the used fluid being extracted from the fluid circulation circuit. A used fluid conduit 532 is connected at one end to a flow direction control valve 530 at port 529, and at the other end to port 559 to thereby communicate used fluid to chambers 640, 636 as directed by valve 550.

Fresh fluid supply tank assembly 562 has a filler neck 572, a vented cap 574, a tank in this case made of heavy duty fluorinated molded polyvinyl chloride, and is somewhat transparent allowing for fluid level indicating volume marks to be affixed or arrange adjacent to the tank to thereby indicate fresh fluid level. Tank assembly 562 has a drain conduit 558 affixed to it which itself has a drain valve 560 provided. Tank assembly 562 contains a fresh fluid 570 which is delivered to pump 624 by fresh fluid conduit 556. A float switch 568 is inserted through a hole in the side wall of tank 564 and is suitably sealed. Float switch 568 is normally closed when an adequate supply of fresh fluid 570 exists, but opens to trigger the shifting of valve 530 into bypass mode when the level of fluid 570 drops below a sufficient level as indicated by float switch 568. A fresh fluid conduit 536 connects pump 624 to port 539 of valve 549 to supply fresh fluid to chambers 638, 634 as directed by valve 549.

Valve 530 is connected to a fluid exchange hose 522 at port 521 and is connected to a bi-directional direction of flow indicator 528 by conduit 523 at port 525. Indicator 528 is in turn connected to fluid exchange hose 520. Hoses 522, 520 have female quick connects 526, 524 provided which are connected to suitably constructed adapter mechanisms (not shown)

A control panel assembly 580 includes an on-off switch and an intermittent start the fluid exchange button, and also an intermittent stop the fluid exchange/shift to bypass button (not shown). Control panel 580 is connected to integrated circuit board assembly 576 by a wiring harness 586 using compatible and integrated connectors (not shown). A power supply assembly 578 provides 12 volt direct current from a 115 volt alternating current source and is connected to integrated circuit board assembly 576 by a wiring harness 584 using compatible and integrated connectors (not shown). Pump 624, float switch 568, bi-directional flow direction indicator 528, and position sensors 620, 618, 622, 616, and valves 549, 550, 530 are connected to communicate to integrated circuit board assembly 576 by a main wiring harness 582 which has suitable connectors at both ends allowing effective connection of these to the integrated circuit board assembly 576. Pump 624, float switch 568, bi-directional flow direction indicator 528, and position sensors 620, 618, 622, 616 all have at least two leads, except for the valves that have at least four with at least two for each solenoid.

A description of the operation of the embodiment of FIG. 18 follows. After the fluid exchanger of FIG. 18 is suitably connected to an opened/separated fluid circulation circuit to be serviced (not shown), the fluid circulation circuit is energized to flow fluid from a circulation pump which pressurizes the circuit after it is rendered operative. This results in used fluid flowing into conduit 520 through female quick connect 524 and then to and through bi-directional fluid flow indicator 528, through conduit 523 to port 526, into port 525, and then through and out of valve 530 (which is in bypass mode) through port 521 to return to the fluid circulation circuit through hose 522 and female quick connect 526. Flow indicator 528 signals integrated circuit board assembly 576 which in turn commands solenoid coil of valve 530, thus placing valve 530 in proper operative fluid flow alignment with the accessed fluid circulation circuit. Used fluid may then flow from conduit 523 through port 525 through valve 530 to and through conduit 532 to be alternatively distributed to pumps 589 and 591 by valve 550.

As illustrated in FIG. 18, during a first mode of exchange device operation, the used fluid enters port 559 of valve 550 and is directed by conduit 546 into chamber 636 causing piston 606 to move to the left in cylinder 590. This piston 606 movement causes the captive fresh fluid held in chamber 634 to be discharged into conduit 542 through port 626, to enter port 543 and pass through valve 549 and out through port 537, to enter fresh fluid conduit 534, to pass through port 527 to enter and pass through valve 530 and out of port 521, and to enter hose 522 to pass through female quick connect 526 to be delivered into the fluid circulation circuit.

Simultaneously, fresh fluid is being pumped into chamber 638 of pump 589 through port 630 from conduit 544 as delivered by fresh fluid pump 624 through conduit 536. This causes piston 604 to move to the right displacing the used fluid held captive in chamber 640 to be discharged out of port 632 through conduits 548, 538 to be discharged into used fluid receiver 552. Upon pistons 606, 604 both reaching their end of stroke position to the left side of cylinder 590 and to the right side of cylinder 588 respective position sensors 618, 622 are triggered. This in turn causes two signals to be sent to integrated circuit board assembly 576 where they are processed. Controller 576 commands valves 549, 550 to transition into the alternative flow arrangement. If used fluid filled signal from sensors 618, 620 is received by the integrated circuit board assembly before an opposing fresh fluid filled signal from 616, 622 is received, the integrated circuit board assembly causes valve 530 to temporarily shift into its middle bypass position (by removing current from the solenoid producing proper fluid flow alignment). As soon as the integrated circuit board assembly has received both opposing signals suggesting that each pump is ready to reciprocate, coordinated signals are sent to switch both valves 549, 550 to their second positions at the same time. In the event that the output capacity of pump 624 is great enough for every fluid circulation circuit it is designed to service, the integrated circuit board assembly will not have to temporarily shift valve 530 to its bypass position and pistons 604, 606 will be free to reciprocate on common command from the integrated circuit board assembly.

It matters not if either piston 604, 606 reaches it fresh fluid recharged position before the opposing piston reaches its used fluid filled position, since the pump 589, 591 which is recharged with fresh fluid is not utilized until completion of the other pump's 589, 591 exchange. Upon both pumps 589, 591 completing respective exchanges, the integrated circuit board assembly will deliver a dual command to valves 549, 550 to shift to their alternate position. This command will be given in the form of the switching of current from one solenoid to the other of each valve 549, 550. This reciprocating, coordinated cycling of pistons 604, 606 continues until either the fluid level of tank 564 drops to a level which opens float switch 568, or at such time that the operator directs. At that point the operator can disconnect the unit from the accessed fluid circulation circuit and reconnect the fluid circulation circuit to normal configuration.

If the unit has an integral sight glass in used fluid discharge conduit 538, or conduit 538 is constructed of somewhat clear plastic, the operator can press the stop button on the control any time he notices that the used fluid has attained the desired level of clarity.

As an additional less costly embodiment, a single cylinder free floating piston unit could be constructed based on the teachings of the embodiment illustrated in FIG. 18. This would eliminate one of the two position fluid distribution valves 549 or 550 and one of the pump 589 or 591. The unit would be arranged and constructed to place the three position flow direction control valve in bypass mode while the single cylinder pump is recharging with fresh fluid which at the same time causes the single cylinder pump to discharge its captive used fluid. This embodiment in many instances will not be as desirable as a dual pump/free floating piston system, since this embodiment will exchange fluid in an intermittent fashion. The length of time for the fresh fluid recharge/used fluid discharge periods when the unit is in bypass top be determined by the level of pumping capacity of the fresh fluid fill pump used. For low flow fluid circulation circuits, the used of a high capacity fresh fluid fill pump may prevent the use a single pump with free floating piston type system from being undesirable.

It is understood that even though numerous characteristics and advantages of the present invention have been disclosed in the foregoing description, the disclosure is illustrative only and changes may be made in detail. Other modifications and alterations are within the knowledge of those skilled in the art and are to be included within the scope of the appended claims.

I claim:

1. A method of exchanging fresh fluid from a fresh fluid reservoir for used fluid from an accessed hydraulic fluid circuit having an outlet port and an inlet port, said method comprising the steps of:

providing a pump assembly having a pump body and a movable pump member disposed relative the pump body, said pump assembly defining at least a first and a second used fluid chamber each having a port for communicating with the used fluid and at least a first and a second fresh fluid chamber each having a port for communicating with the fresh fluid;

providing a fluid control device in communication with the fresh fluid and the used fluid and the pump assembly, said fluid control device having at least a first control position and a second control position;

for a first predetermined period of time, providing the fluid control device in the first control position, wherein the first used fluid chamber is fluidly coupled to the outlet port of the accessed hydraulic circuit, and the second used fluid chamber is fluidly coupled to the used fluid receptacle, and the first fresh fluid chamber is fluidly coupled to the fresh fluid reservoir, and the second fresh fluid chamber is fluidly coupled to the inlet port of the accessed hydraulic fluid circuit, thereby providing a flow of used fluid from the outlet port of the accessed hydraulic circuit into the first used fluid chamber, a flow of used fluid from the second used fluid chamber into the used fluid receptacle, a flow of fresh fluid from the fresh fluid reservoir into the first fresh fluid chamber, and a flow of fresh fluid from the second fresh fluid chamber into the inlet port of the accessed hydraulic circuit;

after said first predetermined period of time, providing the fluid control device in the second control position for a second predetermined period of time, wherein the second used fluid chamber is fluidly coupled to the outlet port of the accessed hydraulic circuit, and the first used fluid chamber is fluidly coupled to the used fluid receptacle, and the second fresh fluid chamber is fluidly coupled to the fresh fluid reservoir, and the first fresh fluid chamber is fluidly coupled to the inlet port of the accessed hydraulic fluid circuit, thereby providing a flow of used fluid from the outlet port of the accessed hydraulic circuit into the second used fluid chamber, a flow of used fluid from the first used fluid chamber into the used fluid receptacle, a flow of fresh fluid from the fresh fluid reservoir into the second fresh fluid chamber, and a flow of fresh fluid from the first fresh fluid chamber into the inlet port of the accessed hydraulic circuit;

after said second predetermined period of time, establishing a cycle by returning the fluid control device to the first control position for said first predetermined period of time; and repeating the cycle to achieve the fluid exchange.

2. A fluid exchange assembly for replacing used fluid from an accessed hydraulic circuit with fresh fluid from a fresh fluid reservoir, said assembly comprising:

a pump, having at least four variable volume fluid chambers: a first working fluid chamber, a second working fluid chamber, a first pumping fluid chamber and a second pumping fluid chamber, each fluid chamber having at least one fluid port;

a boost pump device coupled to at least one of the fluid chambers for providing a pressurization of fluid associated with said at least one fluid chamber; and a fluid control device, operatively coupled to the pump, said fluid control device having a first control position and a second control position.

3. A fluid exchange assembly of claim 2 wherein the pump includes a pair of interconnected pistons.

4. A fluid exchange assembly of claim 3 wherein the pistons are connected with a rod.

5. A fluid exchange assembly of claim 2 wherein the pump includes a dual diaphragm pump.

6. A fluid exchange assembly of claim 2 wherein the fluid chambers of the pump are biased in response to a fluid pressure transferred from the fluid circuit.

7. A fluid exchange assembly of claim 2 wherein the fluid control device comprises at least one fluid valve.

8. A fluid exchange assembly of claim 7 wherein the at least one fluid valve is electrically operated.

9. A fluid exchange assembly of claim 2 wherein the fluid control device comprises an electronic controller which receives input signals and generates output signals to control at least one valve.

10. A fluid exchange assembly of claim 2 further comprising:

a flow aligning valve system in fluid communication with at least a fresh fluid conduit, said valve system aligning a flow of fresh fluid in the fluid exchange assembly relative to a flow of circulated fluid within the accessed hydraulic circuit.

11. A fluid exchange assembly of claim 2 further comprising:
   a bypass conduit in selective fluid communication with a pair of conduits, said bypass conduit selectively communicating a flow between the pair of conduits to reintroduce a fluid into the accessed hydraulic fluid circuit.

12. A device for exchanging fresh fluid from a fresh fluid source for used fluid from an accessed fluid circuit, said fluid circuit being accessed to define an inlet port and an outlet port, said device comprising:
   a plurality of fluid conduits including a fresh fluid conduit and a used fluid conduit;
   a pump having at least four variable volume fluid chambers, including a first and second used fluid chamber and a first and second fresh fluid chamber;
   a fluid control device in communication with the plurality of fluid conduits and the pump, said fluid control device selectively directing used fluid from the fluid circuit into either the first or second used fluid chamber of the pump.

13. A device of claim 12 wherein the fluid control device selectively directs fresh fluid through the fresh fluid from either the first or second fresh fluid chamber of the pump.

14. A device of claim 12 wherein the pump includes a pair of interconnected pistons.

15. A device of claim 14 wherein the pistons are connected with a rod.

16. A device of claim 12 wherein the pump includes a dual diaphragm pump.

17. A device of claim 12 wherein the fluid chambers of the pump are biased in response to a fluid pressure transferred from the fluid circuit.

18. A device of claim 12 wherein the fluid chambers of the pump are biased in response to a fluid pressure transferred from an auxiliary boost pump.

19. A device of claim 12 wherein the fluid control device comprises at least one fluid valve.

20. A device of claim 19 wherein the at least one fluid valve is electrically operated.

21. A device of claim 12 wherein the fluid control comprises an electronic controller which receives input signals and generates output signals to control at least one valve.

22. A device of claim 12 further comprising:
   a flow aligning valve system in fluid communication with at least the fresh fluid conduit, said valve system aligning a flow of fresh fluid in the device relative to a flow of circulated fluid within the accessed hydraulic circuit.

23. A device of claim 12 further comprising:
   a bypass conduit in selective fluid communication with a pair of conduits, said bypass conduit selectively communicating a flow between the pair of conduits to reintroduce a fluid into the accessed hydraulic fluid circuit.

24. A fluid exchange system for use in exchanging a used fluid with a fresh fluid in a vehicle having an automatic transmission and a fluid cooling circuit operatively connected to conduct a circulated fluid therein, said fresh fluid being contained in and dispensed from a source external to said vehicle, said used fluid initially being contained within said vehicle and discharged into a receptacle external to said vehicle, said fluid exchange system comprising;
   a first fluid line intercoupled to the fluid exchange system, the source, and the fluid cooling circuit to conduct fresh fluid from the source into the fluid cooling circuit;
   a second fluid line intercoupled to the fluid exchange system and the fluid cooling circuit to conduct used fluid from the cooling circuit;
   a pump operatively coupled to the first fluid line and the second fluid line, said pump having a plurality of variable volume chambers, including at least one used fluid chamber and one fresh fluid chamber, said plurality of variable volume chambers being biased by a fluid pressure generated by the automatic transmission; and
   one or more valves in fluid communication with the pump for selectively directing fresh and used fluid between the plurality of variable volume chambers.

25. A fluid exchange system of claim 24 wherein the pump is a dual piston pump defining a pair of used fluid chambers and a pair of fresh fluid chambers.

26. A fluid exchange system of claim 24 wherein the pump is a dual diaphragm pump defining a pair of used fluid chambers and a pair of fresh fluid chambers.

27. A fluid exchange system of claim 24 further comprising:
   a flow aligning valve system in fluid communication with at least the first fluid line, said valve system aligning a flow of fresh fluid in the fluid exchange system relative to a flow of fluid circulated within the fluid cooling circuit.

28. A fluid exchange system of claim 24 further comprising:
   a bypass conduit in selective fluid communication with a pair of conduits, said bypass conduit selectively communicating a flow between the pair of conduits to reintroduce a fluid into the fluid cooling circuit.

29. A fluid exchange system of claim 24 further comprising:
   one or more valves in fluid communication with the pump for selectively directing used fluid between the plurality of variable volume chambers.

* * * * *